(12) United States Patent
Rizk

(10) Patent No.: US 10,076,844 B2
(45) Date of Patent: Sep. 18, 2018

(54) AUTOMATED TOOL CHANGE ASSEMBLY FOR ROBOTIC ARM

(75) Inventor: Nabil Michael Rizk, Pittsburgh, PA (US)

(73) Assignee: RE2, Inc., Pittsburgh, PA (US)

( * ) Notice: Subject to any disclaimer, the term of this patent is extended or adjusted under 35 U.S.C. 154(b) by 1841 days.

(21) Appl. No.: 13/389,509

(22) PCT Filed: Aug. 10, 2010

(86) PCT No.: PCT/US2010/045059
§ 371 (c)(1),
(2), (4) Date: Apr. 24, 2012

(87) PCT Pub. No.: WO2011/019742
PCT Pub. Date: Feb. 17, 2011

(65) Prior Publication Data
US 2012/0207538 A1 Aug. 16, 2012

Related U.S. Application Data

(60) Provisional application No. 61/273,880, filed on Aug. 10, 2009.

(51) Int. Cl.
*B25J 15/04* (2006.01)

(52) U.S. Cl.
CPC ............ *B25J 15/04* (2013.01); *B25J 15/0491* (2013.01); *Y10T 29/49815* (2015.01); *Y10T 29/49895* (2015.01); *Y10T 403/58* (2015.01)

(58) Field of Classification Search
CPC .... B25J 15/04; B25J 15/0408; B25J 15/0491; B25J 3/04; B25J 19/0029; B25J 15/0425;
(Continued)

(56) References Cited

U.S. PATENT DOCUMENTS

| 2,103,379 A | 12/1937 | Oxford |
| 2,511,416 A | 6/1950 | Rundorff |

(Continued)

OTHER PUBLICATIONS

"Quick Change End Effector", Willow Garage, Sep. 5, 2009, 2 pages, <http://www.willowgarage.com/blog/2009/09/05/quick-change-end-effector> (video embedded).

(Continued)

*Primary Examiner* — Victor L MacArthur
*Assistant Examiner* — Joseph Brown
(74) *Attorney, Agent, or Firm* — The Webb Law Firm

(57) ABSTRACT

An automated tool change assembly and method for automatically coupling a robotic end effector to a robotic manipulator. The automated tool change assembly of the present invention provides first and second light-weight mechanical joint members for automated coupling to provide a rigid connection that can include an electrical connection to pass power and signals between the end effector and the manipulator. The connection can also have full pass-through mechanical power. The assembly also includes a tool station for docking an end effector. The tool station can also provide a platform to align tools with manipulators in forming the automatic connection between joint members. The tool station also provides a release bar for manually releasing end effectors from manipulators. Software scripts can connect and disconnect the tool change assembly remotely when attached to a robot.

16 Claims, 21 Drawing Sheets

(58) Field of Classification Search
CPC .. B25J 15/0433; B25J 15/0458; B25J 19/0025; B25J 19/0033; Y10T 279/17863; Y10T 279/17888; Y10T 279/17897; B23B 31/113; B23B 2240/04
USPC .................................. 279/89, 93, 94, 900
See application file for complete search history.

(56) References Cited

U.S. PATENT DOCUMENTS

| | | | |
|---|---|---|---|
| 3,680,436 A | 8/1972 | Marsland | |
| 3,845,963 A | 11/1974 | Price | |
| 4,238,167 A | 12/1980 | Brugger et al. | |
| 4,274,774 A | 6/1981 | Haga et al. | |
| 4,486,928 A | 12/1984 | Tucker et al. | |
| 4,551,903 A | 11/1985 | Bisiach | |
| 4,701,994 A | 10/1987 | Noh et al. | |
| 4,710,093 A | 12/1987 | Zimmer et al. | |
| 4,758,122 A | 7/1988 | Kubo | |
| 4,763,401 A * | 8/1988 | Marinoni | B23K 11/318 279/119 |
| 4,830,569 A * | 5/1989 | Jannborg | B25J 15/04 173/117 |
| 4,883,939 A * | 11/1989 | Sagi | B25J 15/0491 901/42 |
| 4,897,014 A * | 1/1990 | Tietze | B25J 15/0206 901/41 |
| 4,913,617 A | 4/1990 | Nicholson | |
| 4,990,022 A * | 2/1991 | Watanabe | B25J 15/04 285/362 |
| 4,993,132 A | 2/1991 | Manz | |
| 4,996,753 A | 3/1991 | Jones | |
| 5,044,063 A * | 9/1991 | Voellmer | B25J 15/0491 901/30 |
| 5,167,478 A | 12/1992 | Ramunas | |
| 5,195,761 A | 3/1993 | Eimer | |
| 5,211,693 A | 5/1993 | Pacher | |
| 5,243,264 A | 9/1993 | Takada et al. | |
| 5,256,128 A | 10/1993 | Neumann | |
| 5,294,209 A | 3/1994 | Naka et al. | |
| 5,328,222 A | 7/1994 | Sartorio et al. | |
| 5,397,159 A | 3/1995 | Sartorio et al. | |
| 5,460,536 A | 10/1995 | Cullen | |
| 5,575,597 A | 11/1996 | Bailey et al. | |
| 5,624,364 A | 4/1997 | Zimmer | |
| 5,632,588 A | 5/1997 | Crorey et al. | |
| 5,752,904 A | 5/1998 | Irri | |
| 5,782,571 A * | 7/1998 | Hufford | B25J 15/04 403/288 |
| 5,857,815 A | 1/1999 | Bailey et al. | |
| 5,879,277 A | 3/1999 | Dettman et al. | |
| 5,993,365 A | 11/1999 | Stagnitto et al. | |
| 6,000,888 A | 12/1999 | Hartman | |
| 6,073,512 A * | 6/2000 | McCormick | G05G 1/04 74/527 |
| 6,116,966 A | 9/2000 | Little et al. | |
| 6,254,303 B1 * | 7/2001 | Falat | B23B 31/113 403/321 |
| 6,533,594 B1 | 3/2003 | Kurup | |
| 7,210,212 B2 | 5/2007 | Lin | |
| 7,252,453 B1 | 8/2007 | Little | |
| 7,484,736 B2 | 2/2009 | Allemann et al. | |
| 7,559,265 B2 | 7/2009 | Mizuno | |
| 7,628,093 B2 | 12/2009 | Madhani et al. | |
| 7,794,171 B2 * | 9/2010 | Park | B25J 3/04 403/349 |
| 8,500,132 B2 * | 8/2013 | Norton | B23B 31/1071 279/140 |
| 8,857,821 B2 * | 10/2014 | Norton | B23B 31/103 279/141 |
| 9,144,909 B2 * | 9/2015 | DeLouis | B25J 15/04 |
| 2004/0012160 A1 | 1/2004 | Krondorfer et al. | |
| 2004/0142803 A1 | 7/2004 | Fitzgibbon | |
| 2004/0267254 A1 | 12/2004 | Manzo et al. | |
| 2005/0063772 A1 | 3/2005 | Bladen | |
| 2005/0079010 A1 | 4/2005 | Droppleman | |
| 2006/0017237 A1 | 1/2006 | Lin | |
| 2006/0088367 A1 | 4/2006 | Dellach et al. | |
| 2007/0031188 A1 | 2/2007 | Glessner et al. | |
| 2007/0228670 A1 | 10/2007 | Norton et al. | |
| 2007/0231063 A1 | 10/2007 | Tsutsumi et al. | |
| 2007/0293380 A1 | 12/2007 | Kausch et al. | |
| 2008/0016979 A1 | 1/2008 | Yasumura et al. | |
| 2008/0056859 A1 | 3/2008 | Inoue et al. | |
| 2008/0119339 A1 | 5/2008 | Oliver | |
| 2008/0132393 A1 | 6/2008 | Jordil et al. | |
| 2008/0216596 A1 | 9/2008 | Madhani et al. | |
| 2008/0229861 A1 | 9/2008 | Inoue et al. | |
| 2008/0232932 A1 | 9/2008 | Jinno | |
| 2008/0236324 A1 | 10/2008 | Inoue et al. | |
| 2008/0257095 A1 | 10/2008 | Kent | |
| 2009/0044655 A1 * | 2/2009 | DeLouis | B25J 15/04 74/490.05 |
| 2009/0139375 A1 | 6/2009 | Hathaway et al. | |

OTHER PUBLICATIONS

"Quick-change end effector", YouTube, Mar. 15, 2009, 2 pages, <http://www.youtube.com/watch?v=2KopL6GVeig> (video embedded).

* cited by examiner

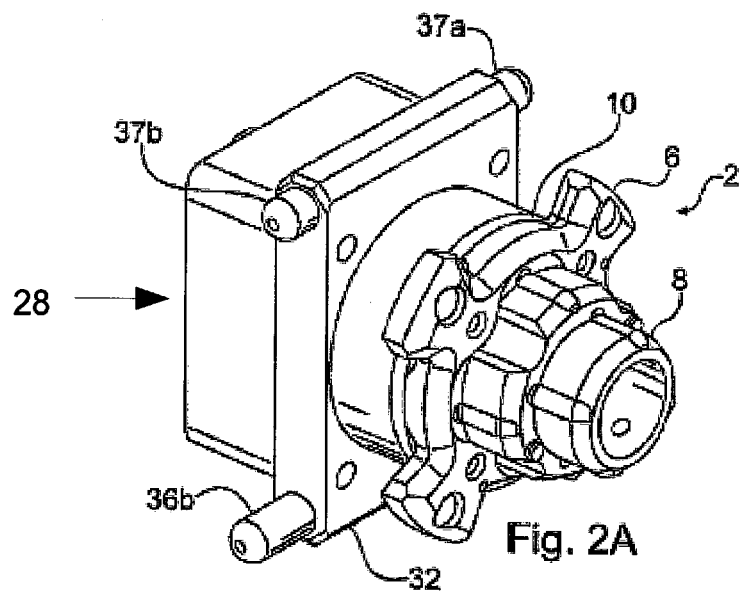
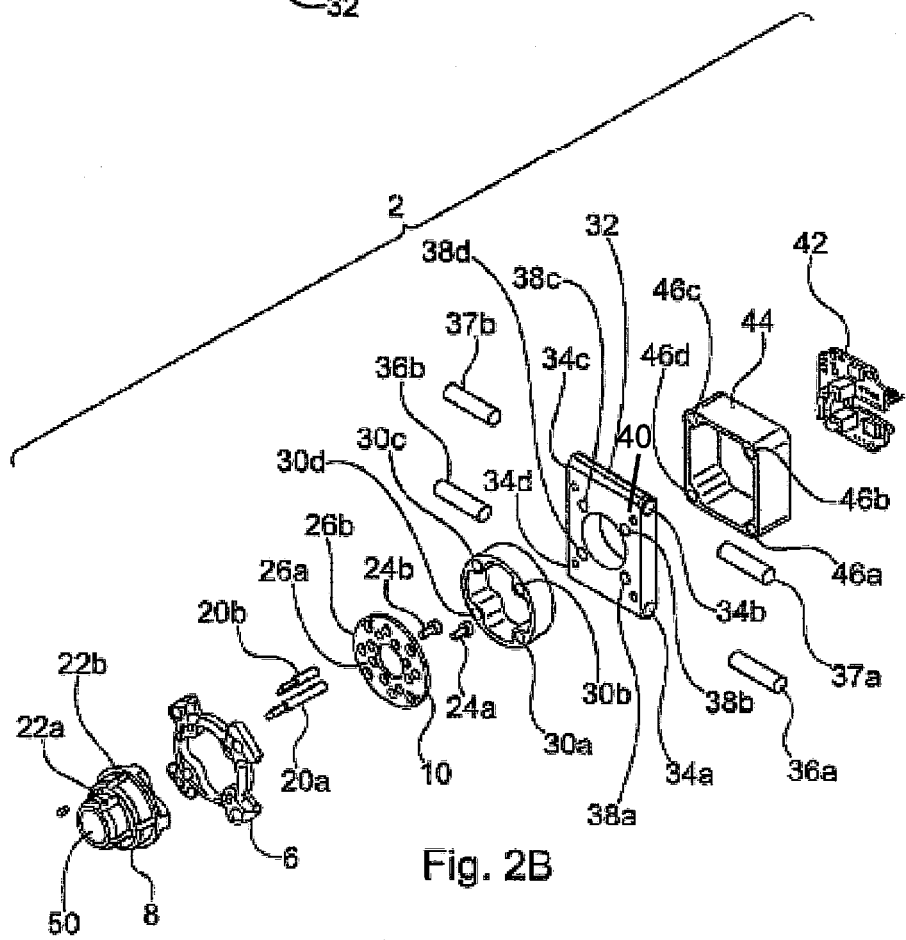

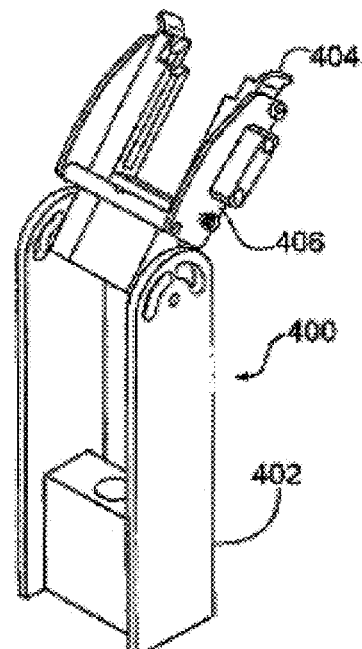
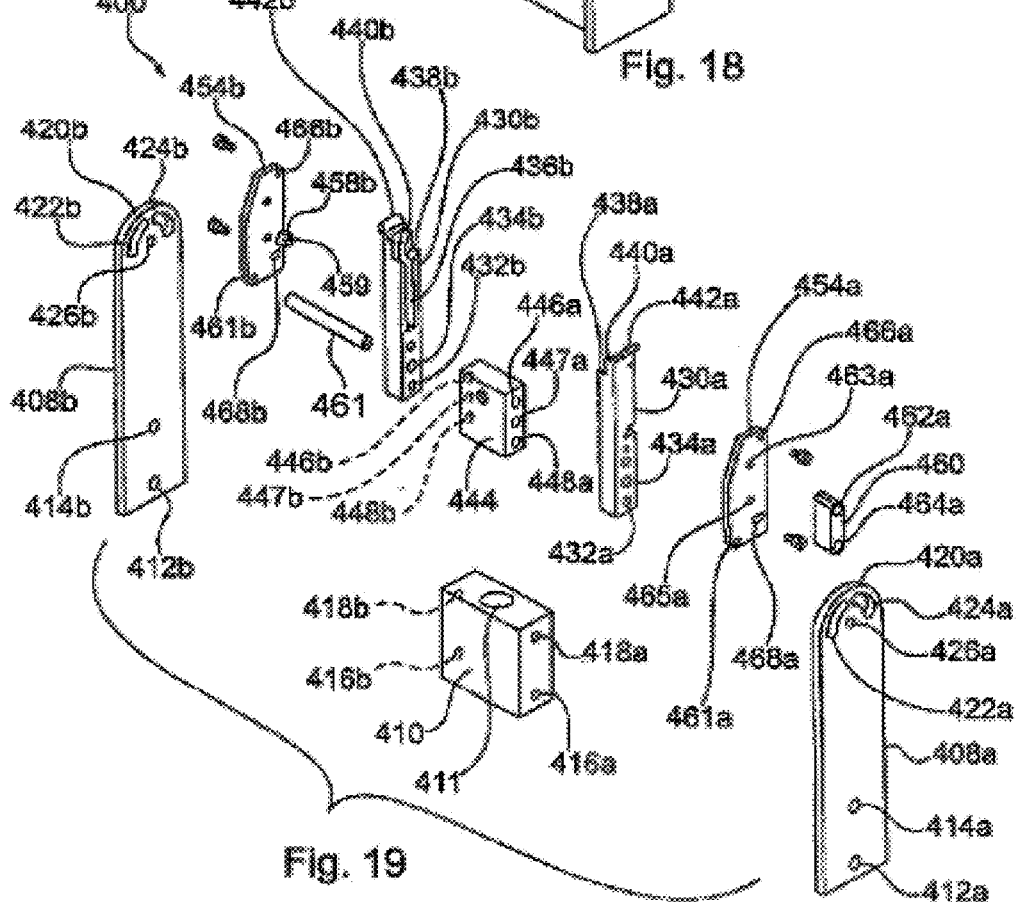

AUTOMATED TOOL CHANGE ASSEMBLY FOR ROBOTIC ARM

CROSS REFERENCE TO RELATED APPLICATIONS

This application is based on U.S. Provisional Patent Application No. 61/273,880, filed Aug. 10, 2009, on which priority of this patent application is based and which is hereby incorporated by reference in its entirety.

BACKGROUND OF THE INVENTION

Field of the Invention

Manipulators on mobile robots require specialized end effectors (tools/components) in order to accomplish particular missions. Currently, deployed systems have end effectors designed, built, and installed at the factory. Factory installed tools can only be repaired or replaced in a factory. This limits the effectiveness of the robot to those missions which can be achieved with a single tool. Heretofore, when a new candidate task is identified, the typical response has been to design and build a new robot intended to perform the specific task. Sometimes existing unmanned ground vehicles (UGV) platforms are used, but just as often, a new robot is created to specifically address the task. This has resulted in a proliferation of small UGVs, each performing admirably on tasks within each of its subset of core competencies, but is generally unsuitable for tasks that vary too widely from its essential purpose. It is impractical to expect field teams to carry multiple UGVs, each suited for a specific task. In addition to the strain on the physical resources of the field team (e.g., transportation and maintenance), different robots come with different control schemes. This reduces the ability of the operator to capitalize on the experience and intuition gained from operating previous robots, because the operator cannot rely on the trained reflexes developed while controlling previous robots. In fact, these differing control schemes lead to operator errors and inefficient control.

Another approach has been to design new, more capable robots, but this approach has drawbacks because even if a robot were designed and built to perform all of the tasks currently assigned to UGVs, it would quickly become outdated as new tasks and jobs are identified. Additionally, external variables, such as physical environment, make UGVs designed for one environment wholly impractical for use in another environment, meaning a number of new robot types would need to be designed, tested, and built. Systems with replaceable end effectors are also ineffective because they require a technician and possibly a number of specialty tools. Generally, these changes would require a technician to remove the current tool and to attach its replacement. This may involve physically disconnecting the tool, disconnecting electrical connections, physically attaching the new tool, and hooking up its electrical connections. The system may also require reconfiguring the control software for each specialized tool. Particularly, in time critical applications, such as military or civilian Explosives Ordinance Disposal (EOD), this process is too slow and interferes with missions.

Military and law enforcement groups are increasingly relying on UGVs to perform life-threatening tasks ranging from under car inspection to EOD. As small UGVs, such as Omni-Directional Inspection Systems (ODIS), Talon and Packbot have gained acceptance, the variety of tasks they have been required to perform has increased. Drive systems utilize significant power, unlike industrial robots, these systems are deployed in uncontrolled environments. Driving a system back and forth to physically disconnect a tool is impractical. Operators can stand more than 300 meters from a site. It can take valuable time and resources to drive a robot away in the course of action.

In addition, it takes a robust design to survive the normal working environment for such devices, both during deployment on the mobile robot and when the manipulator and tools are being stored or transported. Mechanical connections must be compliant to minor variations in manufacturing tolerances of mating components, or environmental tolerances which develop when a tool is dropped or bumped against another tool in the toolbox, or caused by the presence of debris, such as dirt and sand, captured from the working environment.

Robotic arms often require specialized configurations to accomplish their particular mission, requiring change in the length of a link in the arm or attaching a different end effector or tool.

Tools that attach to links of the robotic arm that are pivoting or rotating must be able to withstand the large bending movements and torques that result from this.

An object of the present invention is to provide an automated tool change assembly for separating robotic end effectors mechanically from their manipulator arms during deployment, thus allowing unhindered integration of end effectors as the complexity.

Description of Related Art

SUMMARY OF THE INVENTION

An automated tool change assembly for automatically connecting an end effector to a robotic arm having a first joint member having a locking ring, an electrical connector, and a connection plate, and a second joint member having a cylindrical body, a locking plate, an electrical receiver, a locking member, and a locking collar, the locking collar being coaxially aligned with and slidably coupled to the cylindrical body by mating with circumferentially spaced axial extending legs of the cylindrical body with a cavity. The cavity is defined by a carrier plate of the locking collar, further including the locking member extending axially therefrom, the second joint member including springs between the collar and the carrier plate and providing force on the locking collar axially, outward from the body, the locking plate of the second joint member engaging the locking ring of the first joint member, the locking plate and the locking ring having at least one intervening circumferentially spaced tab, which can be engageable in keyed relationship. The tab can include an engagement hole extending axially therethrough. Axially displacing the first joint member into the second joint member can position first joint member electrical connector adjacent electrical receiver. A counter rotation between the first and second joint members slides the locking ring tab of first joint member under the locking plate tab of second joint member, electrically connecting the electrical connector with the electrical receiver and aligning the engagement holes. The spring force on the locking collar can push the locking pin through the aligned engagement holes of the locking plate and locking ring connecting the first joint member to second joint member.

The assembly of the present invention further includes a follower ring, the follower ring having a tab positioned between the locking plate and the locking collar carrier plate, preventing movement of the locking collar by preventing the locking pin from entering engagement holes, the tab further engaging the locking ring prevents rotation of the locking ring past alignment position and locking ring into alignment with a follower ring of the second joint member.

The locking ring and locking plate further includes a plurality of tabs. A key defined by tabs of the locking ring uniquely engages with an opening formed between two tabs of the lock plate providing only one engagement orientation of the locking plate with the locking ring.

The assembly can further include a gear motor housed in second joint member, a mechanically driven tool connected to the first joint member and a self aligning shaft, wherein the self aligning shaft transfers mechanical power from the gear motor of second joint member to the mechanically driven tool of the first joint member.

The self aligning shaft includes a coupler housed in first joint member having a slotted head, a drive shaft having a dowel pin, a compression spring, and a drive hub housed in the second joint member, the hub having a slotted face, a cross slot and a stepped cylindrical bore. The drive shaft engages the cylindrical bore, such that the drive hub cross slot provides axial compliance as translational freedom along the axis of the drive shaft is limited by the length of the cross slot when the dowel pin interacts with the cross slot. The compression spring positioned inside the cylindrical bore and coupled to the shaft provides axial force away outward. Upon rotational alignment, the coupler head engages the drive hub slotted face and the rotational torque is transferred from the drive shaft, through the drive hub to the coupler for powering the mechanical driven tool.

Mating the dowel pin to the cross slot of the hub can be used to provide rotational torque, however, other methods can also be used to pass torque. The engagement of the locking pin with the engagement holes of the locking ring and the locking plate locks three translational degrees of freedom and three rotational degrees of freedom. The electrical receiver includes a pin holder and a pin having a contact surface, the holder for holding the pin in alignment for coupling the electrical receiver pin contact surface to a contact surface of a pin in a holder of the electrical connector.

The electrical receiver pin contact surface couples to an electrical connector pin contact surface. A rotary wiping motion as the first joint member is rotatably connected to the second joint member is formed, the rotary wiping motion used for removing debris from the electrical contact surfaces. The electrical receiver pin comprises a grooved contact surface, the groove forming multiple contact lines when engaged with the pin of the electrical connector. The electrical receiver further includes a flexible member resting in a notched wall of the pin adjacent the pin holder. The flexible member, an elastomer, can provide axial force directed toward the center of the electrical receiver, the force pressing the contact surfaces together during the displacement of first joint member into second joint member. The flexible member of electrical receiver can further provide compliance or resistance to vibration and have a rotation about a connecting member in a bottom of the conductor pin.

A tool station can serve for holding first joint member for positioning the first joint member for automatic engagement or for automatically disengaging the first joint member. The tool station further comprises an engagement member having a body and arms, the arms having an alignment ramp, and track, the alignment ramp providing a tapered opening leading to the track for engaging the first joint member. Engagement pins of the first joint member engage the alignment ramp, the ramp guiding the engagement pins toward the track such that rotational freedom of the first joint member about an axis of the pins provides compliance with height and location parameters of the second joint member during engagement until further movement of the first joint member toward the base provides connection of second engagement pins of the first joint member with the second alignment ramp, the second alignment ramp guiding the pins into the track such that the rotational freedom of the first joint member is eliminated. A release member having a lock ramp and a striker plate is coupled to the engagement member creating an open and close position for release member. The release member further including a spring member creating force pushing the release member to a close position such that a face of the lock ramp aligns with the locking collar of the second joint member when engaged with a first joint member and striker locks the pin of the first joint member inside the two-stage track. The locking collar provides force on the face of the release member lock ramp opening the release member providing an open two-stage track as the striker is moved. Also included is a mount member having legs and an attachment member for coupling the mount member to a surface, the legs coupled to the engagement member.

The track can be a two-stage track having a first and second alignment ramp or one track, depending on the manipulator's degree of freedom. Second engagement pins can have a shortened length, such that the second engagement pins are guided by second alignment ramp into second track adjacent the first track. A lateral guide ramp for guiding lateral movement of the engagement pins is also included. The tool station can be mounted to a robot, guided machine, or unmanned vehicle. The attachment member is rotatably coupled to the surface providing rotational adjustment for aligning the base with the second joint member during engagement or the first joint member pins during disengagement. The base engagement member is rotatably coupled to the legs providing tilt adjustment for alignment of the axis of the first joint member to the axis of the second joint member during engagement.

A manual release lever such that the manual release lever can open the lock ramp of the release member providing a manual operation for releasing the first joint member. The release member can be actuated by a series of electrically controlled motions of second joint member or manually. The engagement is created with a rotation of the locking ring inside of the locking plate to provide clearance of notches. The locking pin further includes a conical surface for mating a chamfered surface on the teeth of locking ring and plate, wherein rotation forces the chamfered members of locking ring to slide under the chamfered edges of locking plate teeth, such that the chamfered edges facilitate engagement of the teeth.

The first joint member and the second joint member are engaged to form an electrical connection operative to transmit images, control signals, activators, identification information, video, USB, TCP/IP, UDP, and CanBus, feedback information. The second joint member is connected to a robot arm. A component connected to the first joint member is included. The component can comprises one of an arm linkage, an arm segment, arm extender, a gripper, a gimble grip, a flexible joint, a tilt table, a dozer, a shovel, a plow, a pan tilt table, a digger, a sensor, a disruptor, a drill, a saw, a cutter, a grinder, a digging tool, or a camera.

A robot end effector automatic-release arrangement comprises a first joint member having a locking ring, an electrical connector, and an end effector connection plate for connecting to a second joint member having a cylindrical body, a locking plate, an electrical receiver, a locking pin and a locking collar, the locking collar being coaxially aligned with and slidably coupled to the cylindrical body by mating circumferentially spaced axial extending legs of the cylindrical body with cavities defined by a carrier plate of the locking collar, the carrier plate further including the locking pin extending axially therefrom, the second joint member including springs between the body and the locking collar providing axial force on locking collar outward from the body such that the locking plate of the second joint member being engageable in keyed relationship with the locking ring of the first joint member, the locking plate and the locking ring having intervening circumferentially spaced tabs, the tabs include engagement holes extending axially therethrough, rotatably aligning and displacing the locking ring into a second joint member providing an electrical receiver receiving the electrical connector. A counter rotation between first and second joint members forces the locking ring of first joint member to slide under and align with the locking plate to connect with the first joint member and rotates electrical connector forming an electrical connection with the electrical receiver. The axial force on the carrier plate of the locking collar pushes the locking pin through aligned engagement holes of the locking plate and locking ring connecting the first joint member to second joint member, a robot component attached to the first joint member, and an electronic component in the robot component for receiving an electrical signal from a control unit of the second joint member.

The assembly further comprises a tool station, the tool station for holding the first joint member or positioning the first joint member for automatic engagement or automatically disengaging the first joint member. A tool station assembly for automatically connecting of a robot component to a robotic wrist is provided. An engagement member having a body and arms, the arms having a first alignment ramp, a second alignment ramp, and a two-stage track, the first alignment ramp providing a tapered opening leading to the two-stage track. Lower engagement pins of a robotic component engage the first alignment ramp during engagement, the ramp guiding the lower pins toward a full length inner track of the two-stage track such that rotational freedom of the robotic component about an axis of the pins provides compliance with height and location parameters of a robotic wrist during engagement. During movement of the lower engagement pins along the full length track upper engagement pins of the robot component engage the second alignment ramp, the second alignment ramp guiding the upper pins into a shortened outer track of the two-stage track eliminating the rotational freedom of first joint member. A release member having a lock ramp and a striker plate, the release member coupled to the engagement member creating an open and close position for release member, the release member further including a spring member creating force pushing the release member to a close position such that a face of the lock ramp aligns with a locking collar of the robotic wrist when engaged with a first joint member and striker locks the pin of the first joint member inside the two-stage track, the locking collar providing force on the face of the release member lock ramp such that release member is moved to an open position providing an opening on the two-stage track as the striker is moved and a mount member having legs and an attachment member for coupling the mount member to a surface, the legs coupled to the engagement member. The tool station can be mounted to a robot, guided machine, or unmanned vehicle.

In addition, provided by the present invention is a method for connecting a robotic tool to a robotic arm, having the steps of a first joint member having a locking ring, an electrical connector, and a connection plate. A second joint member is provided having a cylindrical body, a locking plate, an electrical receiver, a locking pin, and a locking collar, the locking collar being coaxially aligned with and slidably coupled to the cylindrical body by mating circumferentially spaced axial extending legs of the cylindrical body with cavities defined by a carrier plate of the locking collar, the carrier plate further including the locking pin extending axially therefrom. The second joint member can include springs between the body and the locking collar to provide axial force on the locking collar outward from the body. Aligning the locking ring of the first joint member in keyed relationship with the locking plate of the second joint member, the locking plate and the locking ring have intervening circumferentially spaced tabs, the tabs include engagement holes extending axially therethrough. Displacing the first joint member into second joint member such that the first joint member electrical connector is positioned adjacent electrical receiver, rotating first joint member within second joint member to slide the locking ring tabs of first joint member under the second joint member locking plate tabs, electrically connecting the electrical connector with the electrical receiver; aligning the engagement holes such that the axial spring force on the locking collar carrier plate pushes the locking pin through the aligned engagement holes of the locking plate and locking ring connecting the first joint member to second joint member. Rotating the locking collar, whereby the intervening teeth of the coupler is rotated into engagement with teeth located circumferentially about the locking collar, wherein the locking collar rotation forces the teeth of locking collar to slide over the teeth of coupler. The coupler is clamped into engagement with the first joint member; and engaging a retaining pin to lock the collar to the first joint member.

The method further includes terminating displacement of the first joint member into second joint member when the pin engages locking wall.

BRIEF DESCRIPTION OF THE DRAWINGS

FIG. 2a illustrates a side-perspective view of the tool base assembly of the automated tool change assembly of the present invention;

FIG. 2b illustrates an exploded view of the tool base assembly shown in FIG. 1;

FIG. 14b illustrates a cross-sectional view showing the lock ring engaging the follower ring shown in FIG. 14a;

FIG. 18 illustrates a side-perspective view of a tool station of the automated tool change assembly of the present invention;

FIG. 19 illustrates an exploded view of the tool station shown in FIG. 18;

DESCRIPTION OF THE PREFERRED EMBODIMENTS

The automated tool change assembly of the present invention provides first and second light-weight mechanical joint members for automated coupling. The automated tool change assembly provides a rigid connection, for connecting an end effector to a robotic manipulator. The automated tool change assembly can include an electrical connection to pass power and signals between the end effector and the manipulator. The connection can also have full pass-through mechanical power. End effectors for attaching using the automated tool change assembly can include components such as a retrievable delivery device, gamble grip, dozer, shovel, tilting tools, plow, drills, saws, cutters, grinders, sensors, camera, disrupter, arm extenders, arm linkages, digging tolls, and pan-tilt table. One skilled in the art will recognize this list is not exhaustive and the use of other types of robot components with the automated tool change assembly of the present invention is possible.

A further object of the present invention is adaptability. End effectors can operate seamlessly as the automated tool change assembly provides electrical connectors for transmitting signals between controllers and processors, since they can be plug-n-play. In one embodiment, an operator control unit can identify a current end effector and current controller by reading an embedded chip jumper, or resistor in the end effector and can pass electrical signals to control the end effector through the automated tool change assembly of the present invention. The embedded chip can obtain a unique identifier for that particular end effector. Therefore, when a new end effector is attached using the automated tool change assembly of the present invention, a unique identifier for the tool can be read and passed to an onboard or external computer system that can analyze the signal to identify the present end effector. The operator control unit can transmit messages to the processor on the arm or to operate the end effector accordingly.

Figure 1A:
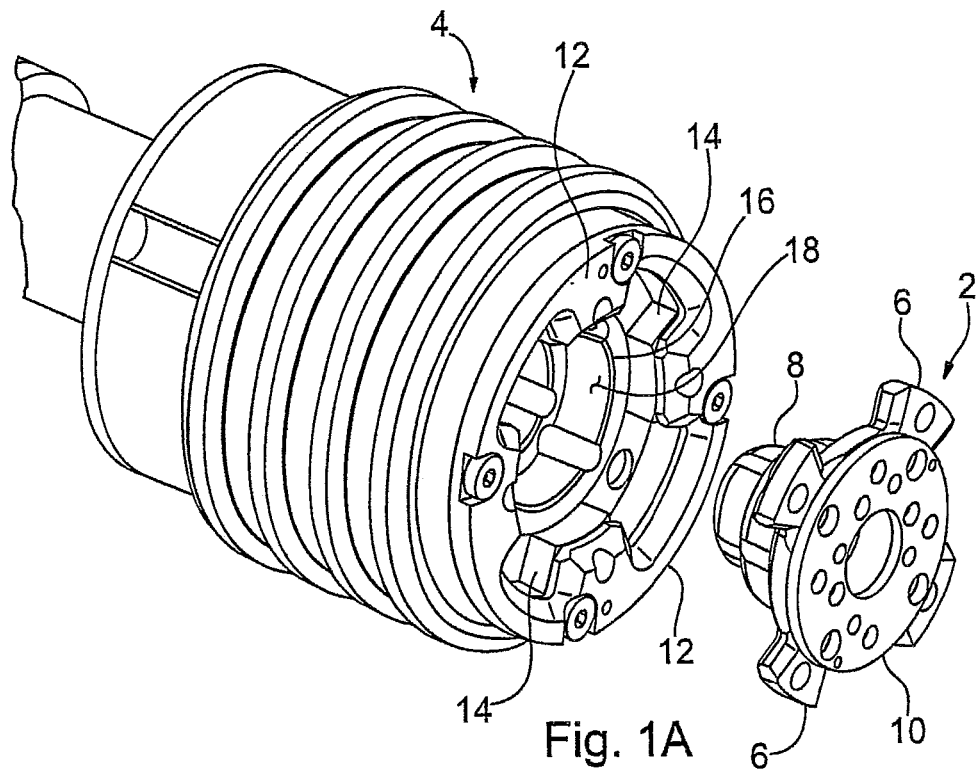
FIG. 1a is a side-perspective view of a tool base assembly and a wrist assembly of the automated tool change assembly of the present invention.

With reference to FIG. 1a, a first joint member, tool base assembly 2 and second joint member, wrist assembly 4 are shown with the tool base assembly 2 positioned to engage with the wrist assembly 4. The tool base assembly 2 can have a lock ring 6, electrical connector 8, and a conductor plate 10. Tool base assembly 2 can be mounted to a number of different end effectors. The wrist assembly 4 can have a lock plate 12, a follower ring 14, and an electrical receiver 16. The wrist assembly 4 forms a cylindrical body having a cavity 18 in the middle for receiving a tool base assembly 2. When the tool base assembly 2 is displaced into the wrist assembly 4, a connection can be made between them. The interaction of the parts of tool base assembly 2 and wrist assembly 4 is discussed in detail below.

Figure 1B:
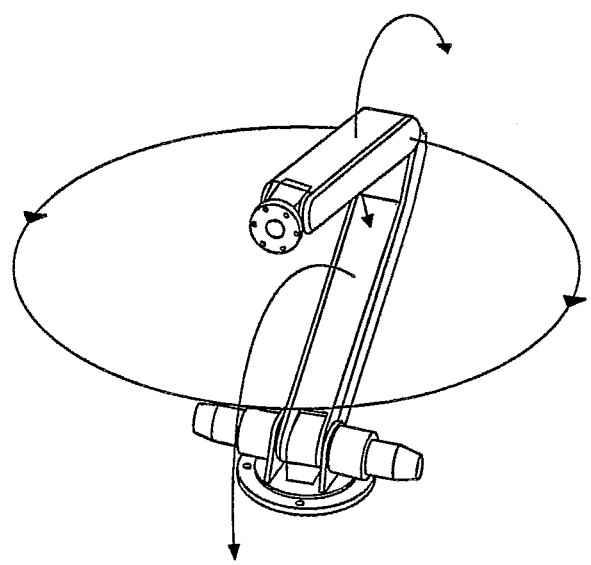
FIG. 1b illustrates a robot arm for use with the automated tool change assembly of the present invention.

With reference to FIG. 1b, a robot arm shows the degrees of freedom that the arm provides. Wrist assembly 4 can be mounted to the end of a four degree freedom arm, which includes yaw, boom, and stick motion, as well as wrist rotation, which is concentric to the axis of the assembly.

With reference to FIG. 2a, in addition to lock ring 6 and electrical connector 8, a tool base assembly 2 can also have a connector plate 32 and lower engagement members, track pins 36a, 36b and upper engagement members, track pins 37a-37d.

With reference to FIG. 2b, an exploded view of the tool base assembly 2 and its member parts including lock ring 6, electrical connector 8, and conductor plate 10 can have conductor pin 20a and a short conductor pin 20b. These pins 20a, 20b are positioned in cavities 22a, 22b formed about the surface of the electrical connector 8. The conductor pins 20a, 20b can be mounted on the conductor plate 10 with pins 24a, 24b connecting with the conductor pins 20a, 20b through holes 26a, 26b of the conductor plate 10.

With continuing reference to FIG. 2, tool base assembly 2 can further have a cylindrical body, electrical casing 28 coupled to the conductor plate 10 using screws (not shown) inserted into holes 30a-30d. Electrical casing 28 can be connected to a connector plate 32. Connector plate 32 has a cavity therethrough and screw holes 38a-38d for coupling with electrical casing 28. Connector plate 32 has a set of holes 34a-34d for attaching lower track pins 36a, 36b, and upper 37a, 37b into them. Lower track pins 36a-36b and upper track pins 37a-37b can have threaded heads or attached using other fastener methods known in the art. When fastened to connector plate 32, the pin body remains external from the holes for coupling with a tool station 400, as described hereinafter. The plate 32 can be coupled to a box 44 with holes 40 for receiving threaded members (not shown) into holes 46 of box 44. Box 44 can hold a microcontroller 42. Microcontroller 42 can store programming instructions and transmit and receive electric signals to other processors or drives to activate control of the end effector that is being used on tool base assembly 2.

Figure 3:
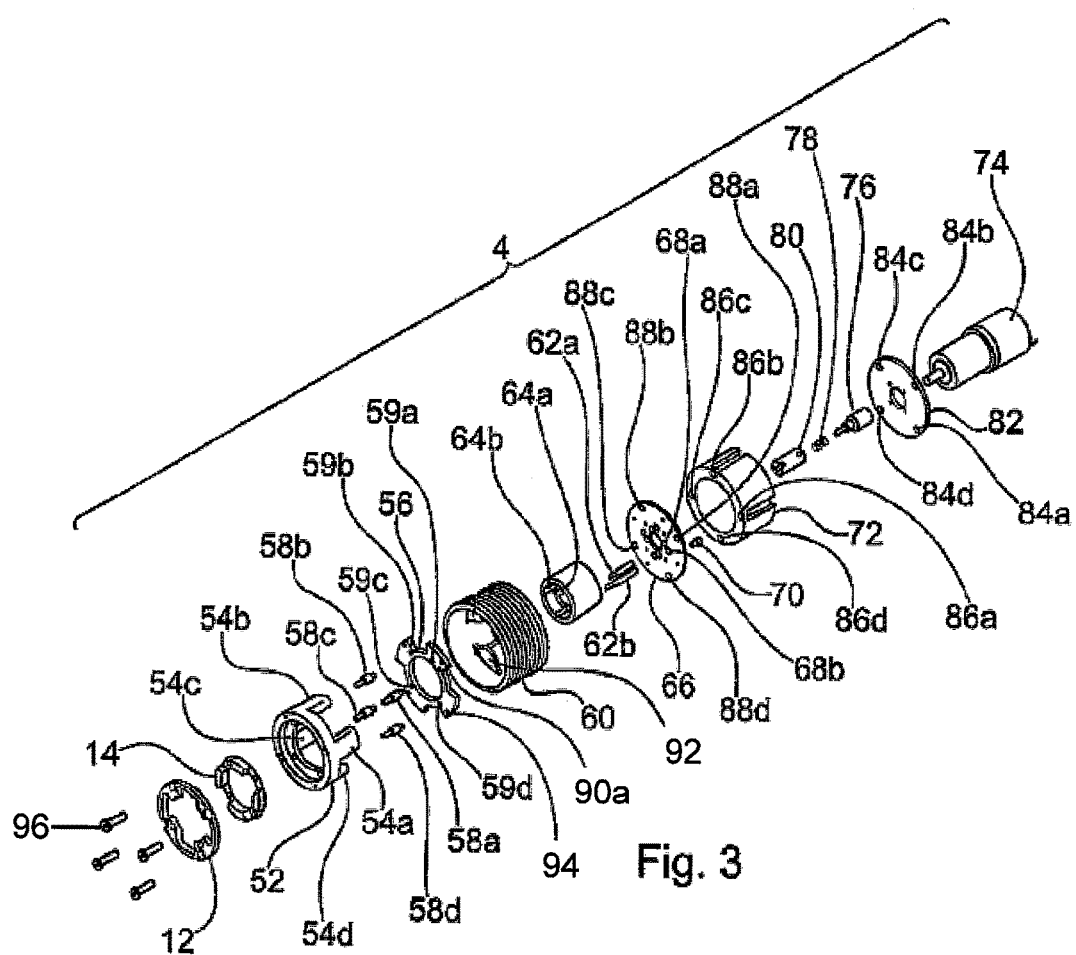
FIG. 3 illustrates an exploded view of the wrist assembly components shown in FIG. 1.

With reference to FIG. 3, an exploded view of the wrist assembly 4 and its member parts including the lock plate 12, follower ring 14, and electrical receiver 16 is shown. As shown in FIG. 1, wrist assembly 4 can have a continuous cavity 18 running the length of wrist assembly 4 and passing through each member of wrist assembly 4. Wrist assembly 4 can have a body, lock hub 52. Lock hub 52 fastened to lock plate 12 and holding follower ring 14. Lock hub 52 can have a cylindrical shape with a set of legs 54a-54d circumferentially placed, extending axially inward and intertwined with carrier plate 56. The carrier plate 56 can have tabs 90a circumferentially spaced and extending radially outward. Each tab 90a having a set of respective holes 59a-59d and 94. Holes 59a-59d are for holding pins 58a-58d. Holes 94 are for coupling to a lock collar 60. Lock collar 60, a cylindrical body having a set of tabs 92 positioned circumferentially and radially facing inward on the inside of the lock collar 60 can fasten to corresponding tabs 90a of the carrier plate 56. Legs 54a-54d of lock hub 52 can pass through cavities formed between the connector of collar 60 and the carrier plate 56. The carrier plate can have lock member fastened thereto, for example, a set of lock pins 58a-58d mounted to carrier plate 56. The pins 58a-58d can engage holes 57 of the lock hub 52 and coinciding holes of lock ring 6, lock plate 12, and follower ring 14, as described below.

With continued reference to FIG. 3, electrical receiver 16 can have conductor pins 62a, 62b inserted into slotted surfaces 64a, 64b formed on an internal wall of electrical receiver 16. The pins 62a, 62b can be held in place by a conductor plate 66 having holes 68a, 68b through which a pin 70 can pass and further insert into an axial hole (not shown) in the bottom of conductor pin 62a, 62b, giving it support and holding it in position. One skilled in the art will recognize any number of conductor pins can be used in the housing depending on the type of electrical connections needed.

A cylindrical grooved housing 72 can be coupled to the conductor plate 66 holding a motor 74 for passing mechanical power can be coupled thereto and held in position by a plate 82 jointly coupled to housing 72 and motor 74. Housing 72 can provide a mechanical power take off (PTO) self-aligning drive shaft at least partially inside. The PTO can have a driveshaft 76, a compression spring 78, and a drive hub 80 and is described in detail hereinafter. Plate 82 can hold the PTO from moving and it is connected to the housing 72. Holes 84a-84d of plate 82 can receive threaded members (not shown) to fasten plate 82 to housing 72. Holes 86a-86d of housing 72 can receive threaded members passing through holes 88a-88d of conductor plate 66 and into holes (not shown) on locking collar 60. Members 96 fasten the lock plate 12 to lock hub 52. One of skill in the art will recognize that threaded members can include screws, pins, or other fasteners.

Figure 4A:
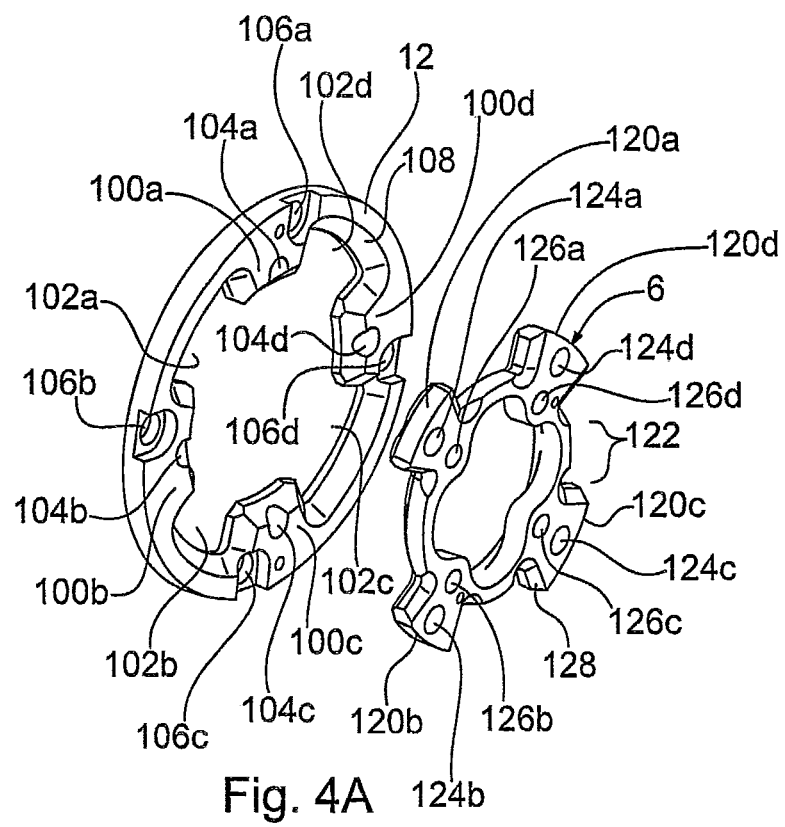
FIG. 4a illustrates a side-perspective view of a lock ring and lock plate of the automated tool change assembly of the present invention.

In FIG. 4a, the lock ring 6 and lock plate 12 are shown aligned ready for engagement. The lock ring 6 can have tabs 120a-120d. The tabs 120a-120d can form a clover leaf configuration. In one embodiment, one of the tabs, tab 120c can define a key tab having a slightly larger size than tabs 120a, 120b, 120d. The tabs 120a-120d define notches 122. The tabs 120a-120d corresponds to tabs 100a-100d of lock plate 12. The lock ring 6 further includes holes 124a-124d, 126a-126d. The tabs 120a-120d of lock ring 6 can have chamfered edges 128. The lock plate 12 can have tabs 100a-100d, also defining notches 102a-102d between the tabs 100a-100d. The tabs 100a-100d can have a hole 104a-104d therethrough. The lock plate 12 can also have chamfered surfaces 108 about the rim of the tabs 120a-120d and notches 102a-102d. The chamfered surfaces 108 and 128 can facilitate the mating of lock ring 6 and lock plate 12. When mating, key tab 120c ensures the tabs 120a-120d of the lock ring 6 only mate with tabs 100a-100d of lock plate 12 in one position, ensuring the tool base assembly 2 is aligned properly with the wrist assembly 4 for displacement into the wrist assembly 4.

Figure 4B:
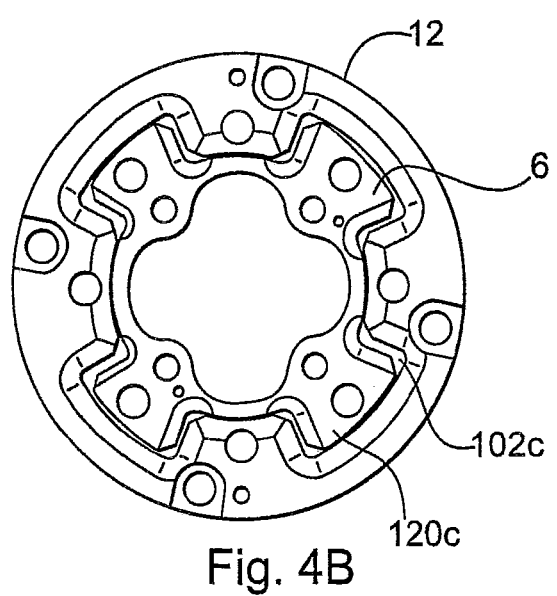
FIG. 4b illustrates a front view of the lock ring and lock plate of FIG. 4a shown in an engaged position.

With reference to FIG. 4b, displacing lock ring 6 axially into the lock plate 12 positions the tabs 120a-120d within the notches 102a-102d formed by tabs 100a-100d of lock plate 12. The key tab 102c can have a special size or shape where it is only fitting into the key notch 102c of lock plate 12.

Figure 5A:
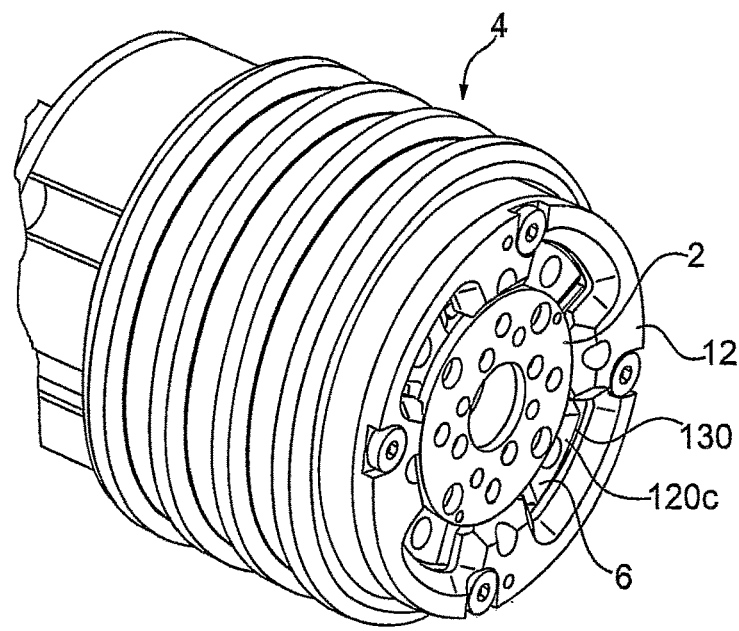
FIG. 5a illustrates a front view of the tool base assembly displaced inside a wrist assembly of the automated tool change assembly of the present invention.

With reference to FIG. 5a, the tool base assembly 2, after alignment, can be displaced into the wrist assembly 4. The wrist assembly 4 limits the amount of displacement of the tool base assembly 2 as the electrical receiver 16 mates with electrical connector 8 and the axial movement of the tool base assembly 2 into wrist assembly 4 is stopped. After axial movement of tool base assembly 2 is stopped, rear surface 130 of lock ring 6 is inside lock plate 12 of the wrist assembly 4.

Figure 5B:
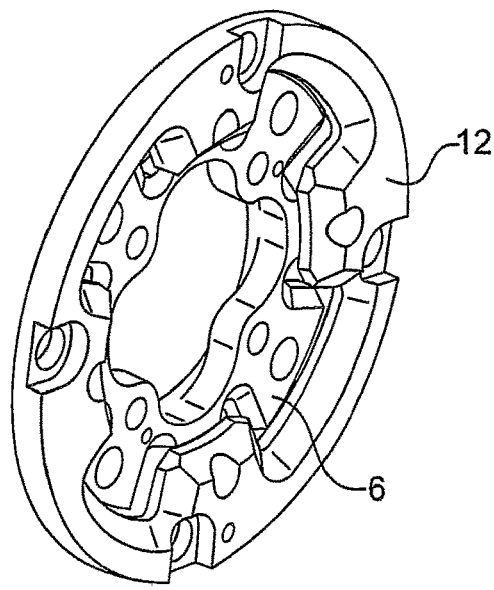
FIG. 5b illustrates a front view showing a lock ring of a tool base assembly displaced inside a lock plate of a wrist assembly.

With reference to FIG. 5b, the lock ring 6 is positioned inside of the lock plate 12 and no further axial movement of tool base assembly 2 can take place.

Figure 6:
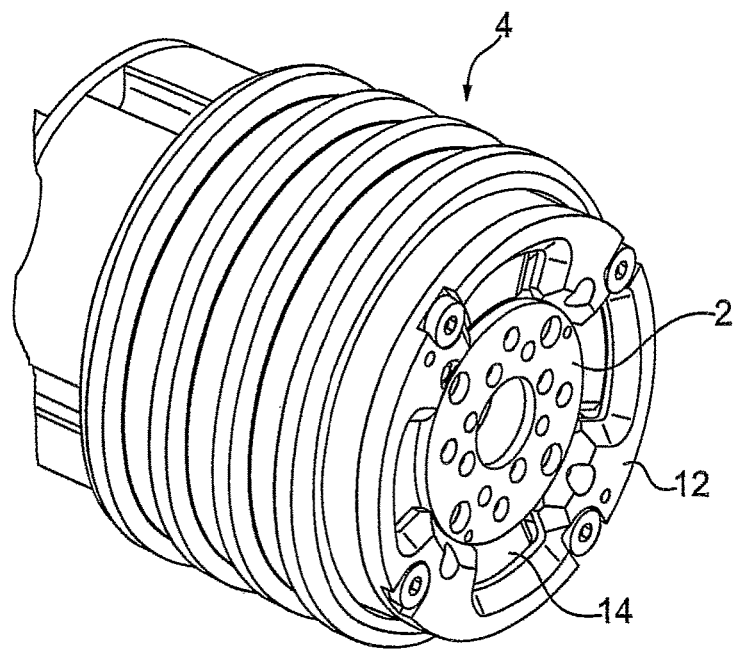
FIG. 6 illustrates a front view of the tool base assembly connected to a wrist assembly of the automated tool change assembly of the present invention.

With reference to FIG. 6, when the automated tool change assembly is fully engaged with the lock ring 6 as the tool base assembly 2 is rotated, the tabs 120a-120d of the lock ring 6 are rotated and forced underneath the tabs 100a-100d of lock plate 12. Rotational force on the lock ring 6 also causes the rotation of the follower ring 14, moving the tabs on the follower ring 14 to coincide with the notches 102a-102d of the lock plate 12.

Figure 7:
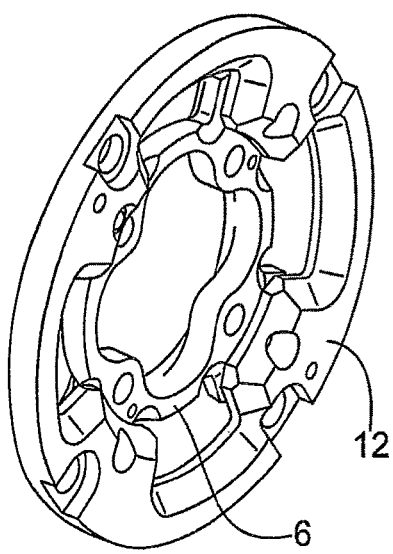
FIG. 7 illustrates a view of a tool base assembly lock ring and wrist assembly lock plate shown in FIG. 6.
Figure 8:
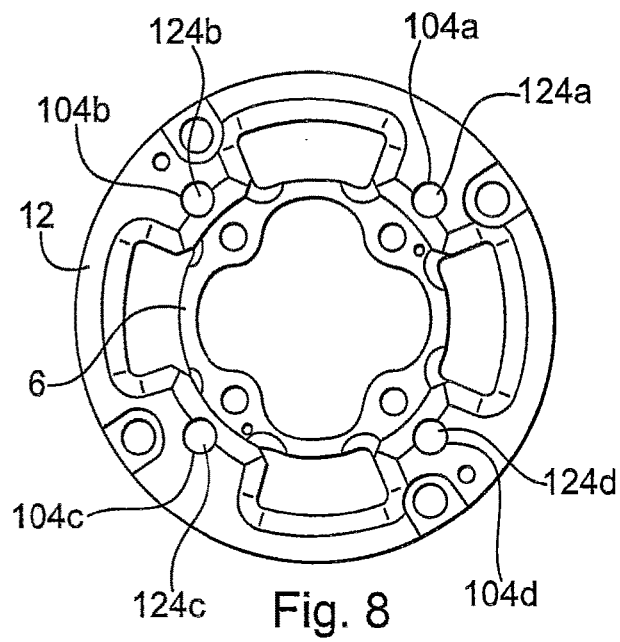
FIG. 8 illustrates a top-perspective view of a lock ring and lock plate shown in FIG. 7.

With reference to FIG. 7, when the lock plate 12 and lock ring 6, align holes 104a-104d of lock plate 12 align and with the respective holes 124a-124d of lock ring 6. With reference to FIG. 8, the position of lock ring 6 is inside lock plate 12.

Figure 9A:
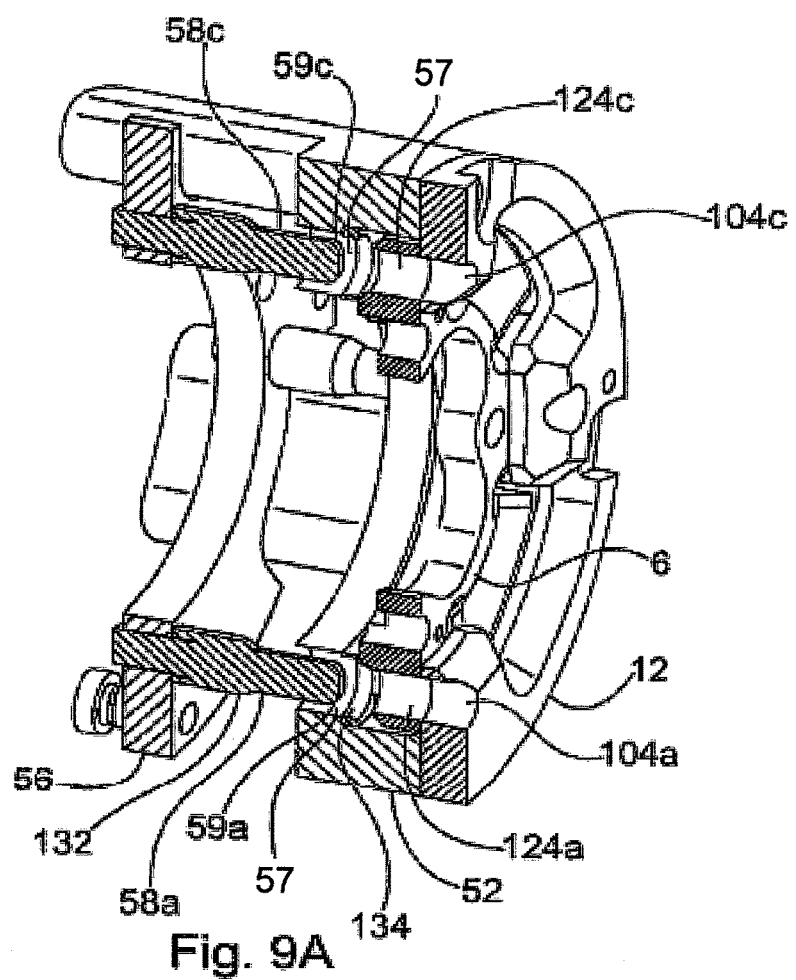
FIG. 9 illustrates a cross-sectional view of the connected wrist assembly and tool base assembly shown in FIG. 8.
Figure 9B:
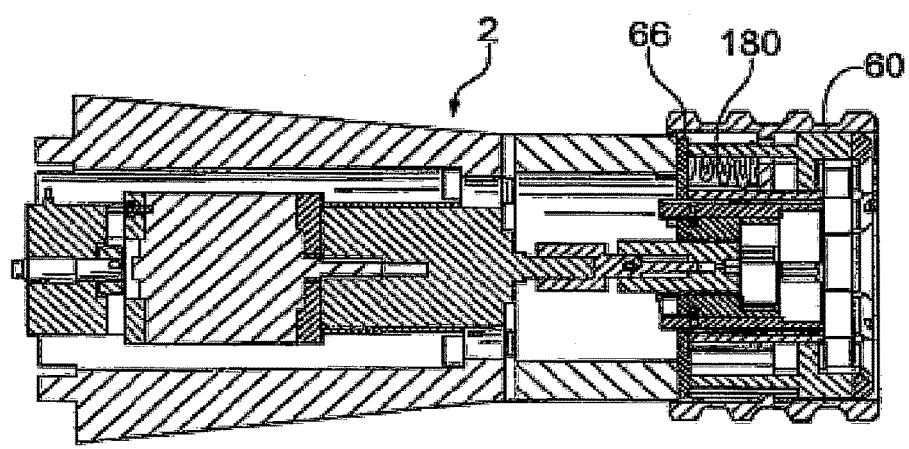

With reference to FIG. 9a, when lock ring 6 and the lock plate 12 are aligned, pins 58a-58d of carrier plate 56 are free to move into the holes 104a-104d of the lock plate 12 and the holes 124a-124d of lock ring 6. With reference to FIG. 9b, springs 180 can be positioned between the plate 66 and lock collar 60. The pins 58a-58d of carrier plate 56 have an axial force placed on them by springs 180 in the locking collar 60, causing the pins 58a-58d to move into the holes 104a-104d and 124a-124d when the lock plate 12 and lock ring 6 are rotated into complete alignment relative to each other. The wrist assembly 4 and the tool base assembly 2 lock when the pins move into the holes, locking three translational degrees of freedom and two of the rotational degrees of freedom between the wrist assembly 4 and the tool base assembly 2. The lock ring 6 includes a chamfered surface 134 on the inside of the holes. A conical shoulder 132 of the pins 58a-58d will rest against surface 134 when fully engaged as described hereinafter.

Figure 10:
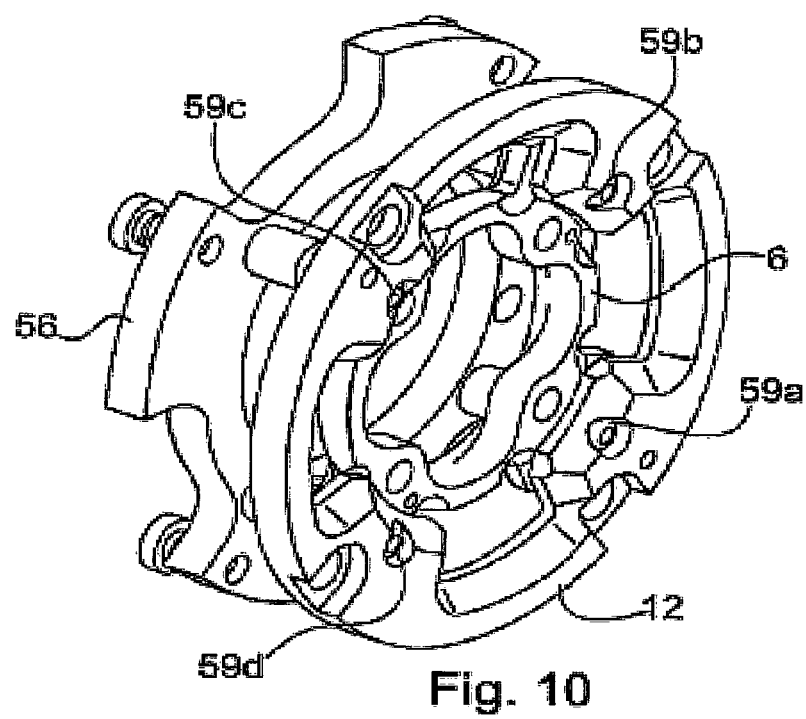
FIG. 10 illustrates a side-perspective view showing the locking collar, and pins of the automated tool change assembly of the present invention in an engaged position.

With reference to FIG. 10, when the tool base assembly 2 and the wrist assembly 4 are rotated into the alignment position, the lock pins 58a-58d and the carrier plate 56 slide axially toward the holes 102a-102d, 124a-124d to create a double-shear pin joint in the four locations where the holes 102a-102d, 124a-124d are aligned. Lock pins 58a-58d can be slightly rounded, tapered, or sloped on the leading edge to provide a self-guided action to tolerate misalignment between the wrist assembly 4 and the tool base assembly 2.

Figure 11:
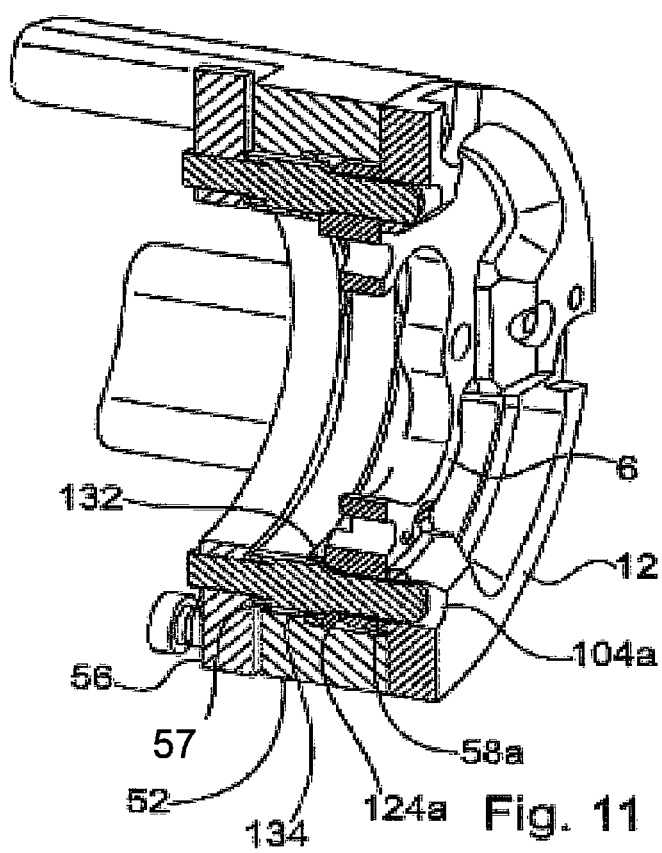
FIG. 11 illustrates a cross-sectional view of the tool base assembly and wrist assembly shown in FIG. 10.

With reference to FIG. 11, when lock ring 6 is engaged with lock plate 12, pins 58a-58d mate with holes 57 of lock hub 52. In addition, the pins 58a-58d can have a smaller diameter than the holes 120a-120d of lock ring 6 and holes 102a-102d of the lock plate 12. This smaller diameter is utilized for tolerating debris as well as manufacturing variations. The conical shoulder 132 of pins 58a-58d wedges against chamfered surface 134 of the lock ring 6. Locking collar springs apply axial force on the conical shoulder 132 of pins 58a-58d, pushing the shoulder 132 into the chamfered surface 134, allowing friction and spring force to provide sufficient force to keep pins from popping out when side force occurs. The angular slope of the conical pin is steep enough that side force will not pop out the pin and not so steep that it self locks, in one embodiment defining a 45° angle. This movement provides a self-centering of the pins 58a-58d in the hole 124a-124d, aligning the lock ring 6 and removing backlash between the tool base assembly 2 and the wrist assembly 4. Component parts of the automated tool change assembly are manufactured to tolerate debris and manufacturing variations. As the automated tool change assembly is designed to form connections between loose fitting parts, the tapered engagement of each lock pin 58a-58d leaves clearance for debris.

Figure 12:
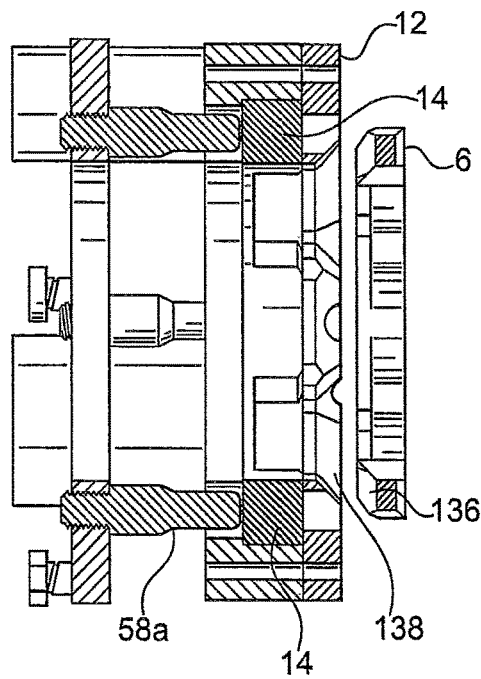
FIG. 12 illustrates a cross-sectional view of a wrist assembly having a lock ring ready for engagement of the automated tool change assembly of the present invention.

With reference to FIG. 12, the lock ring 6 can have chamfered surfaces 128 to ease a chamfered surface 136a-136d. Similarly, lock plate 12 can have chamfered surfaces 108. Chamfered surface 136 of lock ring 6 coincide with chamfered surfaces 138a-138d of lock plate 12 and facilitate mating of the surfaces as the tool base assembly 2 is displaced into the wrist assembly 4. The chamfered edged surfaces 136a-136d and chamfered surfaces 138a-138d meet and help the lock ring 6 slide past the lock plate 12. Additional chamfered surfaces can ease the rotational resistance when the lock ring 6 and lock plate 12 are rotated against each other, causing the lock ring 6 to slide under the lock plate 12.

Figure 13A:
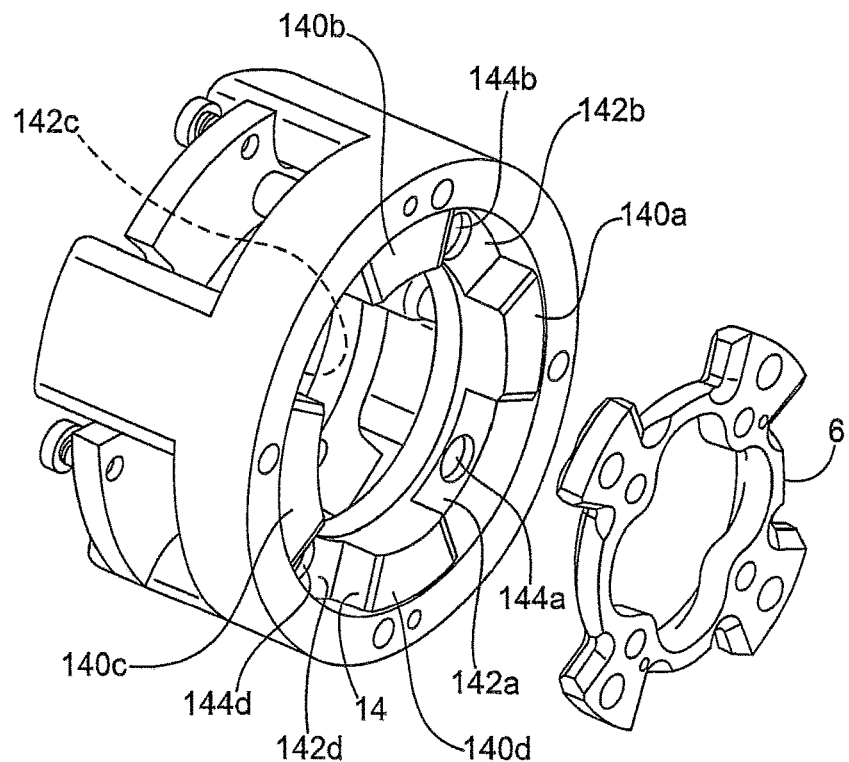
FIG. 13a illustrates a side-perspective view of a lock ring and follower ring of the wrist assembly of the automated tool change assembly of the present invention.

With reference to FIG. 13a, the lock ring 6 is shown aligned with follower ring 14 of wrist assembly 4. The follower ring 14 can have members tab 140a-140d forming notched surfaces 142a-142d having a detent 144a-144d therein. The detent 144 of follower ring 14 can have a ball detent assembly which keeps the follower ring 14 in the disengaged position until a tool is inserted. A member (not shown), such as a ball or tab can be formed on the lock hub 52 for mating with the detents 144a-144d.

Figure 13B:
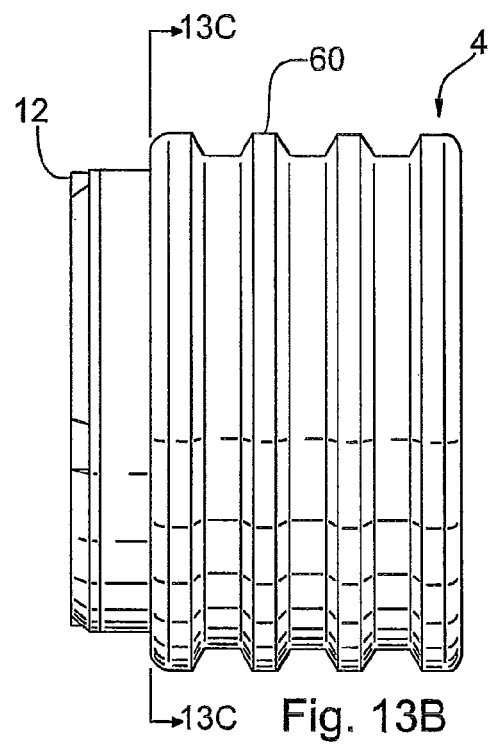
FIG. 13b illustrates a side-perspective view of a wrist assembly locking collar of the automated tool change assembly of the present invention.
Figure 13C:
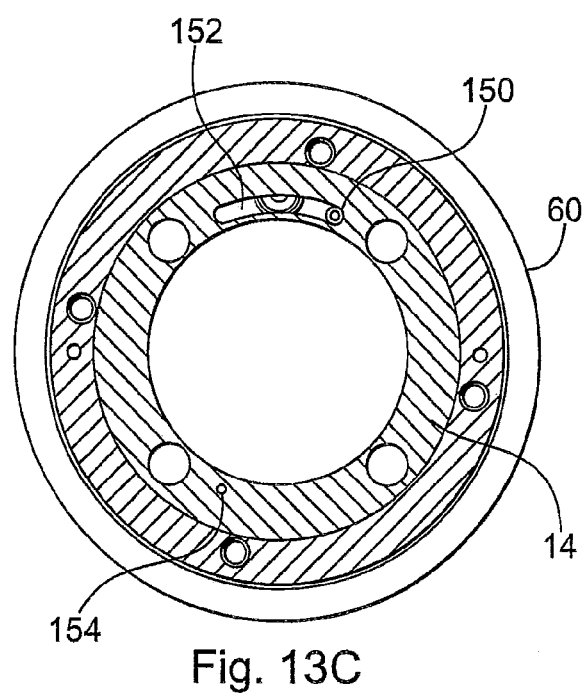
FIG. 13c illustrates a cross-sectional view of FIG. 13b alone line A.

With reference to FIG. 13b, wrist assembly 4 is shown unengaged. With reference to FIG. 13c, a cross section of follower ring 14 of wrist assembly 4 a long lines A-A of FIG. 13b, showing a slot 152 formed in follower ring 14 for mating with a member, pin 150 fastened to lock hub 52. The combination of pin 150 with slot 152 can limit the rotation of follower ring 14 during engagement and thereby limit the rotation of the wrist assembly 4 counter to the tool base 4. For example, rotation can be limited to 45° in an embodiment having four tabs on lock ring 6 of tool base 2. Other embodiments are envisioned having a different number of tabs on the lock ring 6, lock plate 12, and follower ring 14 where a different rotational angle is needed, slot 152 can provide such an angle.

Figure 14A:
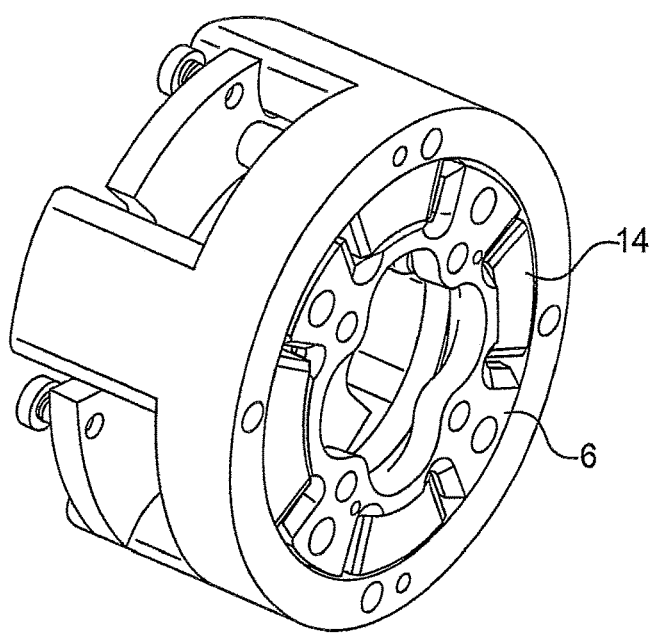
FIG. 14a illustrates a lock ring engaging a follower ring of the wrist assembly of the automated tool change assembly of the present invention.

With reference to FIG. 14a, the follower ring 14 is in the open position and the lock ring 6 has been displaced into the follower ring 14. In the open position, the lock pins 58a-58d of the locking collar 14 is prevented from sliding into the locked position (see FIG. 12). This prevents the locking collar 60 from opening, especially when no tool base assembly 2 is inserted. By blocking the pins 58a-58d, the locking collar 60 also remains open, the springs having a potential to move the collar 60 when open. The user of the automated tool change assembly can move the follower ring 14 by placing the tool base assembly 2 into the wrist assembly 4 and rotate it until the locking collar 60 slides into the locked position.

Figure 14B:
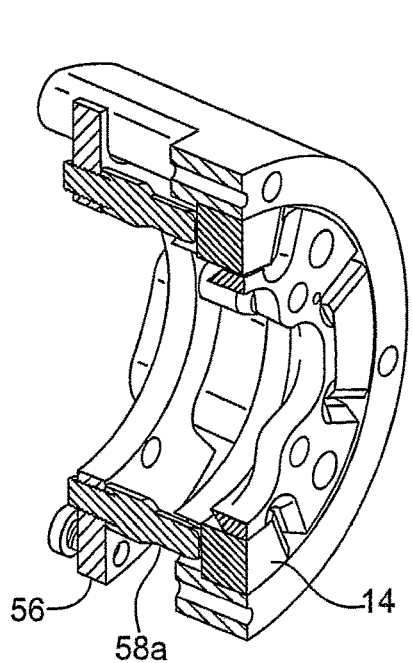

With reference to FIG. 14b, when the lock pins 58a-58d are pressing against the closed follower ring 14, the pins 58a-58d are prevented from moving into the engagement position.

Figure 14C:
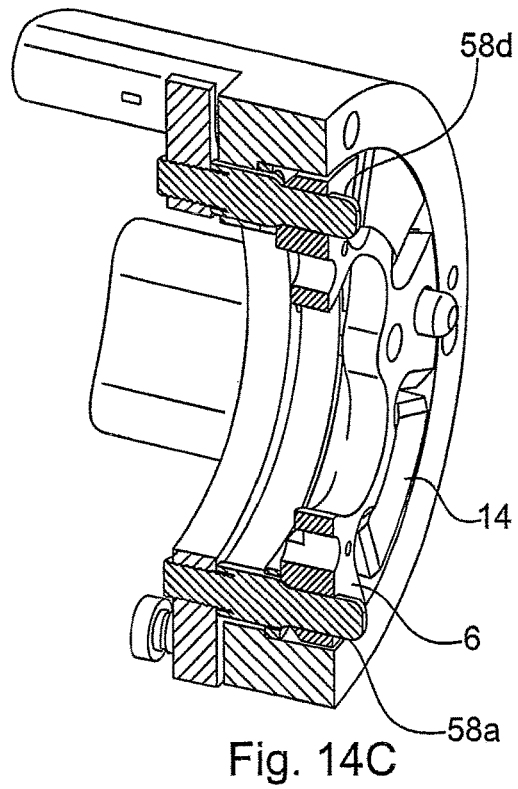
FIG. 14c illustrates a cross-sectional view of the lock ring shown in FIG. 14b in the connected position.

With reference to FIG. 14c, when the lock ring 6 has been rotated, it causes the rotation of the follower ring 14 into the closed position. In the closed position, the pins 58a-58d are freed to move through holes 144a-144d of follower ring 14. The follower ring 14 can limit the rotation of the tool to a 45 degree rotation required to engage and disengage the tool base assembly 2 from the wrist assembly 4. This keeps the keying assembly aligned within the wrist assembly 4.

Figure 15A:
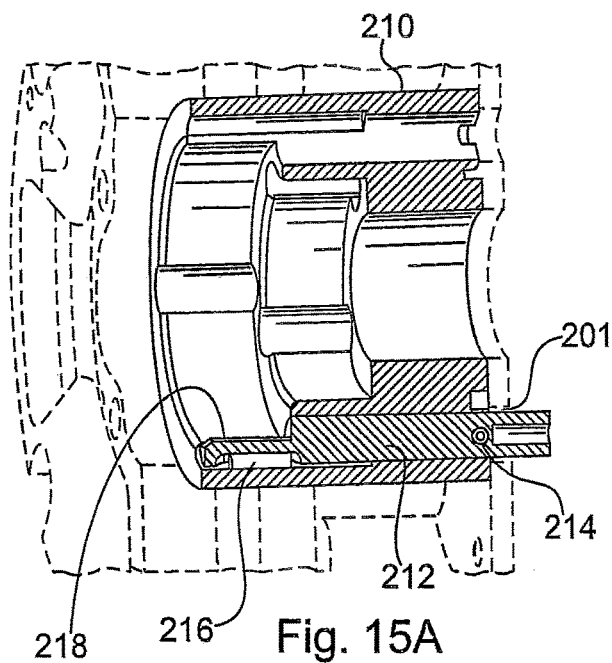
FIG. 15a illustrates a side-perspective view of a roll pin seated in an electrical connector of the automated tool change assembly of the present invention.
Figure 15B:
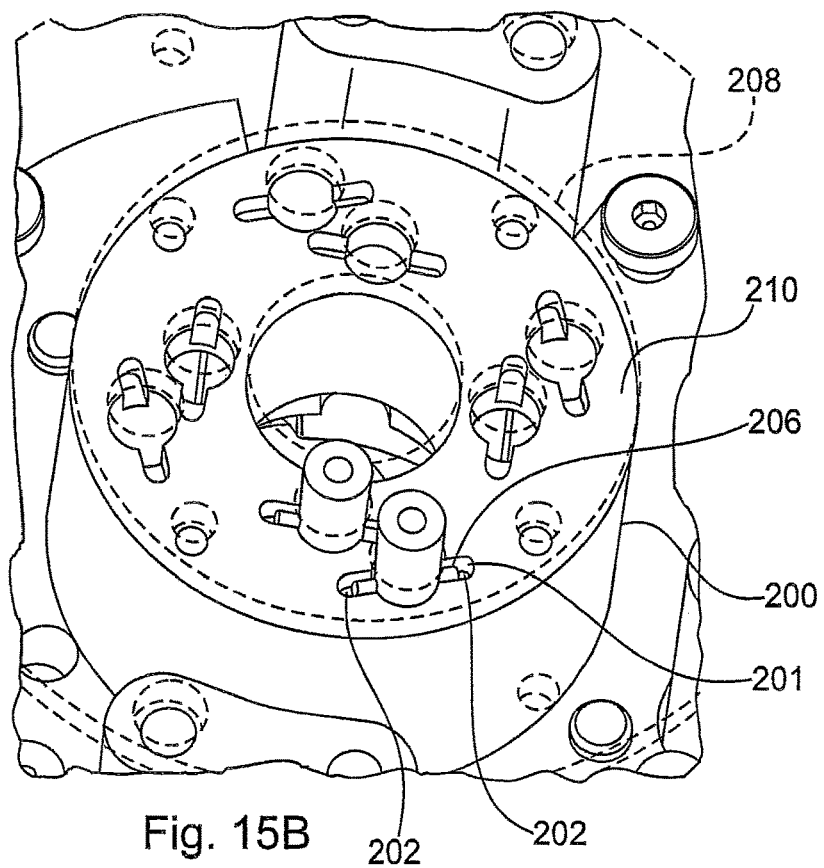
FIG. 15b illustrates a cross-sectional view of the electrical connector of the wrist assembly of the automated tool change assembly of the present invention.

With reference to FIG. 15a, a conductor pin mounting assembly can have a conductor block 200 having holes for receiving conductor pins placed about the conductor block 200. A hole 201 can receive a conductor pin 212 having a cross hole 214. On the back 210 of the conductor block 200, hole 201 can include a slot 202. An end of conductor pin 212 having cross hole 214 extends from the back 210 of conductor block 200. Cross hole 214 receives a roll pin 206, which is seated in the slot 202 of hole 201. The roll pin 206 mates with the slot 202 of hole 201. A fiberglass plate 208 can be inserted on top of conductor block 200 once the roll pins 204 have been fastened. The fiberglass plate 208 is an insulating plate that is bolted in place over the roll pins 204, maintaining the roll pins 204 position. The rotational position of the roll pins 204 is aligned and the roll bar 206 acts as a pin joint to allow the roll pins 204 to pivot about the axis of the roll pins 204. This method is also useful for quick disassembly.

Returning to FIG. 15a, the conductor pin 212 further includes an elastic member 216 placed between the surface of the conductor block 500 and the conductor pin 212. The elastic member 216 provides force directed toward the center axis of the wrist assembly 4 to press the contacts together upon the tool base assembly 2 displaced into the wrist assembly 4. The elastic member 216 also provides compliance, allowing the pin 212 to partially rotate about the axis. During engagement, the rotation of pin 212 in connection with the electrical receiver at condition 510 of tool base assembly 2 causes contact surface 218 to come in contact with a contact surface of a corresponding pin.

Figure 16:
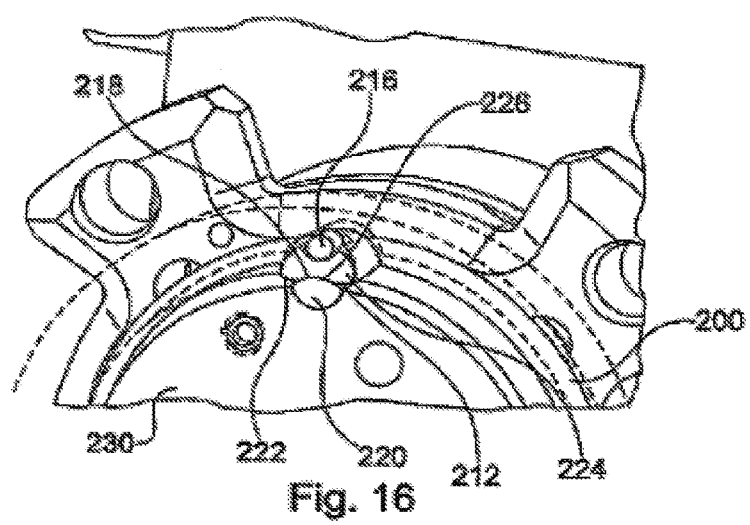
FIG. 16 illustrates a top view of mating conductor pins of the automated tool change assembly of the present invention.

With reference to FIG. 16, the electrical receiver conductor block 200 can mate with an electrical connector conductor block 230. Conductor pin 212 of conductor block 200 can have contact surface 218 and elastic member 216 engaged between the rear surface. The contact surface 218 of pin 212 is shown having a detent 222 forming a first contact point 224 and a second contact point 226 when rotated, sweep against a conductor pin 220 of the connector 218. A conductor pin 220 of conductor block 230 contacts the detent surface 222 of conductor pin 220 forming electrical contacts at two points 224, 226 due to the detent 226 of pin 212. When pin 220 of the tool base assembly 2 comes into contact with the pin 212 of wrist assembly 4 during a rotary motion, the pins 220, 212 provide a wiping action against each other to clean and dislodge debris. The opposing pins provide counter forces, therefore, the contact system does not contribute any tool insertion force and the load path is contained within the conductor block 200, so the arm only needs to provide a small torque to rotate the contacts into engagement. The elastic member 216 provides resistance to force and provides compliance against vibration, electrical noise, and low tolerances.

Figure 17A:
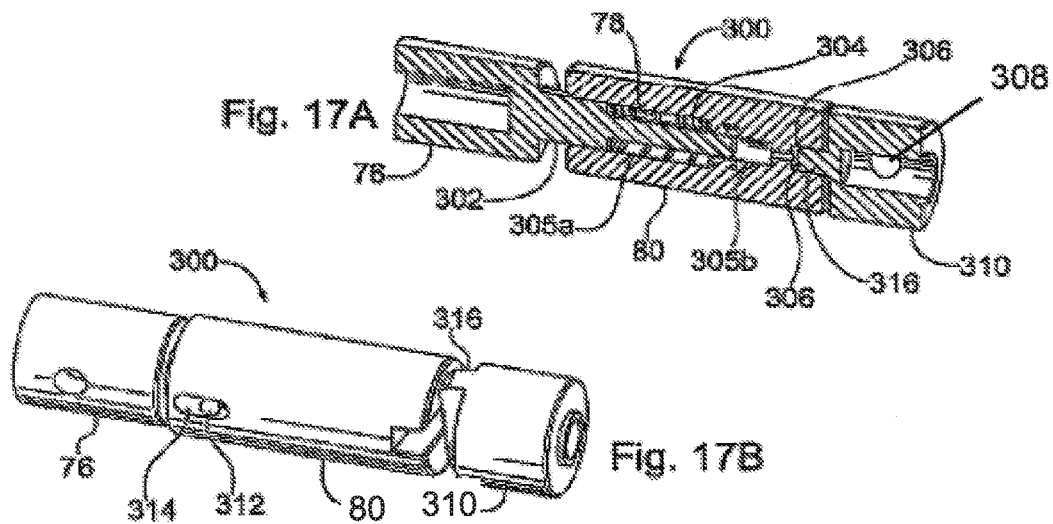
FIG. 17a illustrates a cross-sectional view of the engaged mechanical power take off self-aligning driveshaft of the automated tool change assembly of the present invention.

With reference to FIG. 17a, a mechanical power take off (PTO) self-aligning drive 300 can have drive shaft 76, compression spring 78, and drive hub 80 positioned in the wrist assembly 4. A coupler 310 can be positioned in the tool base assembly 2. PTO 300 can be used to mechanically couple driven tools connected using the automated tool change assembly with a motor residing within the wrist assembly 4. The drive shaft 76 is coupled to the output of a motor using a slip fit bore and a set screw or other clamping method known in the art. The drive shaft 76 can have a stepped pilot shaft 302 with a stepped portion 304 and a cross hole (not shown). The drive hub 80 can have a cylindrical bore 305a having a stepped surface 305b and a slotted face 306 with a vent 308 to prevent build up of a vacuum. The drive hub 80 can receive the compression spring 78 and stepped pilot shaft 302 of drive shaft 76 within the bore 305a.

Figure 17B:
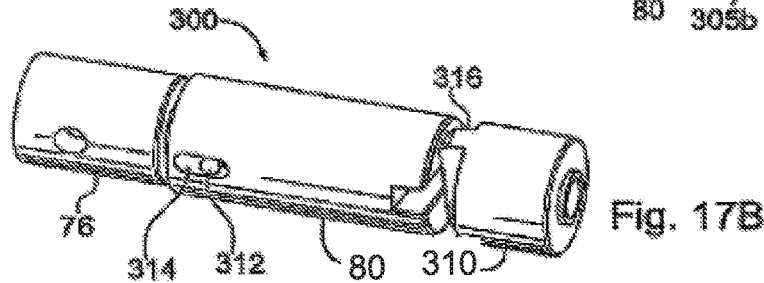
FIG. 17b illustrates a coupler preparing to engage a driveshaft of the automated tool change assembly of the present invention.

With reference to FIG. 17b, a dowel pin 312 is inserted through cross hole 314 of drive hub 80 and a cross hole (not shown) in drive shaft 76 holding the shaft 76 and spring 78 within the hub 80. Five degrees of freedom are constrained by the dowel pin 312. The only free degree of freedom is translation freedom along the axis of the drive shaft 76. The translation freedom is only limited by the length of the cross hole 314 as the dowel pin 312 moves therein. The dowel pin 312 transfers torque about the axis of the drive shaft 76 and slides along the slot 314 of hub 80 to provide axial compliance. The compression spring 78 is captured in-between the drive shaft 76 and the drive hub 80 to provide an axial force toward the tool base assembly 2. The axial force provides an engagement force to engage the hub 80 to coupler 310, having a slotted face 306 which mates with a slotted surface 306 of the drive hub 80. The slotted head 316 of coupler 310 mates with slotted face 306 of drive hub 80. The coupler 310 can mate with an end effector connected to tool base assembly 2. The coupler 310 provides a self-alignment, which can prevent binding during manual and automated tool change.

Figure 17C:
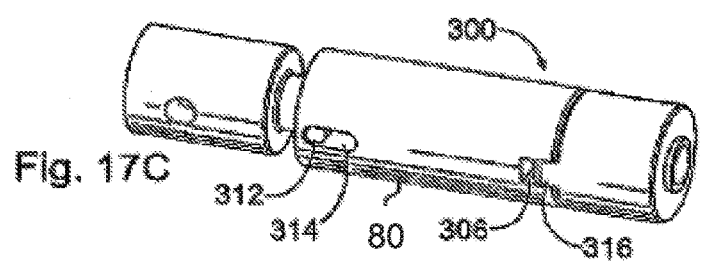
FIG. 17c illustrates a side-perspective view showing a coupler drive engaging a driveshaft of the automated tool change assembly of the present invention.

With reference to FIG. 17b, coupler 310 is shown in the disengaged position. As it is rotated, the slotted head 316 of coupler 310 is inserted into a slotted face 306 of hub 80, it becomes engaged as shown in FIG. 17c. The movement of dowel pin 312 within cross hole 314 is due to the spring force acting on hub 80 causing axial movement into engagement with coupler 310. One skilled in the art would recognize that other mechanisms to transfer torque between the drive shaft and drive hub could be used.

With reference to FIG. 18, the automated tool change assembly further includes a tool station 400. The tool station serves the function of holding the tools when not in use by an arm. In addition, tool station 400 can provide correct positioning for tool base assembly 2 during engagement. The tool station 400 can also interact with the wrist/tool assembly for disengagement. The tool station 400 can have legs 402, arms 404, and lock ramp 406. The tool station 400 can be mounted on the surface of a robot in a space relative to the arm. The mount can provide rotational adjustment to allow the center plane of the tool station 400 to align with the wrist assembly 4 from the top. One tool station 400 is used for each tool base assembly 2 on a robot. Any number of tool stations 400 can be used on a robot, depending on the space available on the robot.

With reference to FIG. 19, the tool station 400 can have legs 408a, 408b having holes 412a, 412b and 414a, 414b, respectively. A block 410 is provided for mounting to a surface, such as a robot unmanned vehicle. A bore 411 of block 410 can receive a fastener for fastening to a surface, holes 416a, 416b, 418a, 418b of block 410 can be coupled to holes 412a-412b and 414a-414b of 408a, 408b with a fastener, such as a screw or pin. Legs 408a, 408b can have an arched top 420a, 420b, arched adjuster holes 422a-422b, and arched adjuster holes 424a-424b, and a further hole 426a therethrough. This adjustment provides capability to align the tool base assembly 2 axis to the axis of the wrist assembly 4 from the side. The holes 422a-422b, 424a-424b 426a-426b can be used to fasten legs 402 to arm member 404, as shown in FIG. 18. Tool station 400 can have arms 430a, 430b, having holes 432a-432b, 434a-434b for connecting arms 430a-430b with the adjuster holes 422a-422b, 424a-424b, and holes 426a-426b of legs 408a and 408b. The screws can be used to adjust the angular position of the arm 404 about the axis formed by holes 426a-426b. Arm 430a-430b can further have a two-stage track 436a-436b (not shown). 436a-436b has ramped surfaces 438a-438b, 440a-440b, ramps 438a-438b formed on an outer surface of ramps 440a-440b. The ramped surfaces 438a-438b act as ramps with respect to pins 36a-36b and 37a-37b of tool base assembly 2 (see FIG. 2), guiding the tool base assembly 2 into engagement with the tool station 400 as the arm 404 lowers the tool base assembly 2 into the tool station 400. The shortened length of ramps 438a-438b delays the engagement of the upper pins 37a-37b of tool base assembly 2. The upper pins 37a-37b can also have a shorter length, thereby not engaging with ramps 440a-440b. Guides 442a-442b provide for lateral compliance of the lower pins 36a-36b with the tool station 400. Block 444 includes holes 446a-446b, 447a-447b, 448a-448b holding the arms 430a-430b together.

With continuing reference to FIG. 19, plates 454a-454b are provided having a striker 458a (not shown) and 458b positioned on an internal surface extending outward having a ramped surface 459 on one side thereof. The plates 454a-454b can be attached by a hollow cylindrical bar 461 coupled to holes 461a-461b. The plates 454a-454b can also have a manual release 460 attached with holes 462a-462b and 464a-464b to holes 463a-463b, respectively. Holes 466a-466b and 468a-468b are provided for fastening plates 454a-454b to the arms 404.

Figure 20:
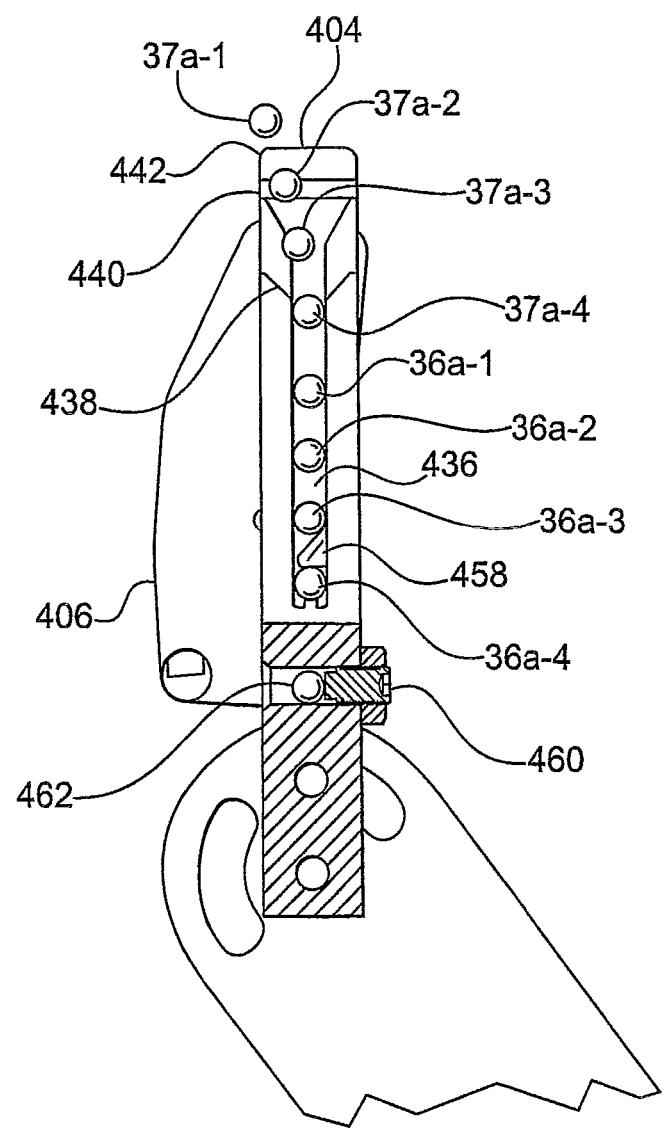
FIG. 20 illustrates a view of the tool station shown in FIG. 18 connecting to a tool base assembly of the automated tool change assembly of the present invention.

With reference to FIG. 20, the alignment ramps 438a-438b and 440a-440b can provide an opening leading to the two-stage track 436a-436b, guiding engagement pins 36a-36b and 37a-37b. The degree of freedom of the engagement pins 36a-36 and 37a-37b is restricted after entering the ramps. Movement of the lower pins 36a-36b along track 436 provides precise guidance of the tool base assembly 2 relating to the tool station 400 regardless of what the wrist assembly 4 is doing. The ramp guides the lower engagement pins 36a-36b during stages 1-4 of engagement. The full length of two-stage tracks 436a-436b, and as it does, rotational freedom of the tool base assembly 2 about the axis of the lower pins 36a-36b provides compliance with height and location parameters of the wrist assembly 4 during engagement. The rotational freedom is unrestricted during movement of the lower pins 36a-36b down the track 436a-436b during 95% of the movement. Further movement of the tool base assembly 2 into the tool station 400 provides connection of the second upper set of engagement pins 37c-37d with the second alignment ramp 438. The second alignment ramp 438b guides the upper pins 37c-37d during engagement steps 1-4 into a shortened outer track of the two-stage track 436, eliminating rotation freedom of the tool base assembly 2. As the lower pins 36a-36b enter and move down the track 436 during stages 1-3 of engagement, they meet the striker 458, causing the striker 458 to resist the pins 36a-36b during stage 3 of engagement. As the lower pins 36a-36b continues from stage 3 of engagement, they move the striker 458 downward against spring force transferred from manual release bar 460 to a member 462 of lock ramp 406. When the pins 36a-36b are clear, the spring force causes the striker 458 to return to the closed position at stage 4 of engagement.

Figure 21A:
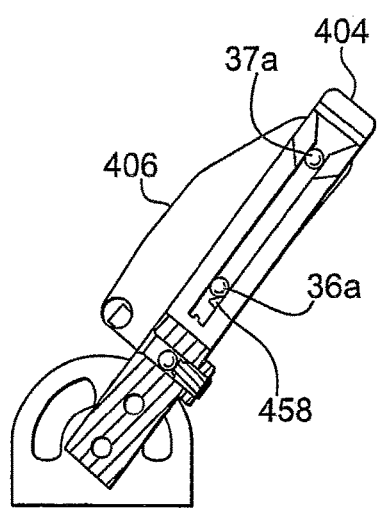
FIG. 21a illustrates a view illustrating a tool station with a step through of a tool base assembly.
Figure 21B:
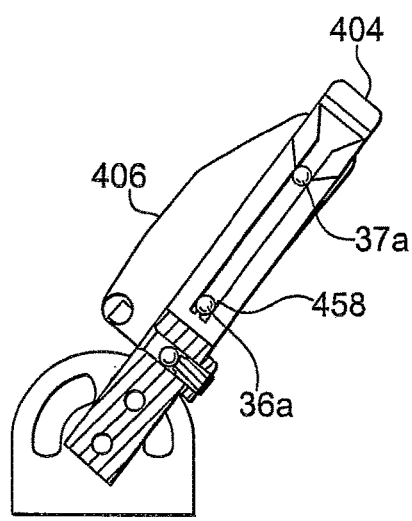
FIG. 21b illustrates a tool station in time sections showing a tool base mechanism of the automated tool change assembly of the present invention.

With reference to FIG. 21a, the pin 36a-36b can move over the striker 458. When pins 36a-36b are positioned over the striker 458, the striker 458 is lowered to its original position. Pin 37a is still rotationally free. With reference to FIG. 21b, the striker 458 is completely open to allow the pins 36a-36b to pass. Pin 37a is not restricted rotationally.

Figure 21C:
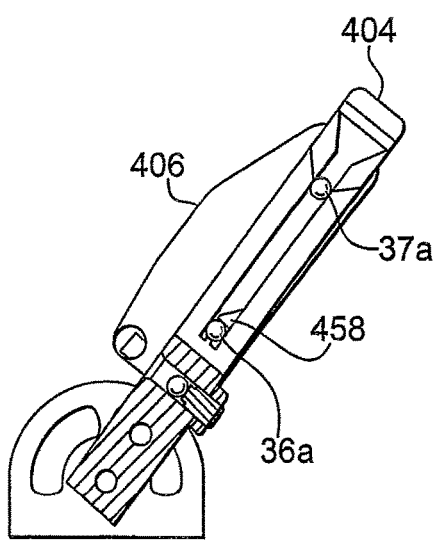
FIG. 21c illustrates a tool station in time sections showing a tool base mechanism of the automated tool change assembly of the present invention.

With reference to FIG. 21c, the pins 36a-36d are locked behind the striker 458 when the striker 458 returns to its initial position and the upper pin 37a-37b are inside the track 436.

Figure 22:
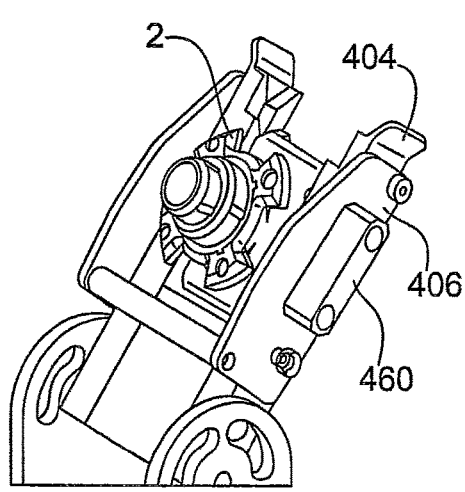
FIG. 22 illustrates a top-perspective view illustrating a tool station engaged with a tool base assembly of the automated tool change assembly of the present invention.

With reference to FIG. 22, a handle on the side, bar 460 provides manual operation for an operator to open the lock ramps and remove the tool base assembly 2 from the tool station 400.

Figure 23:
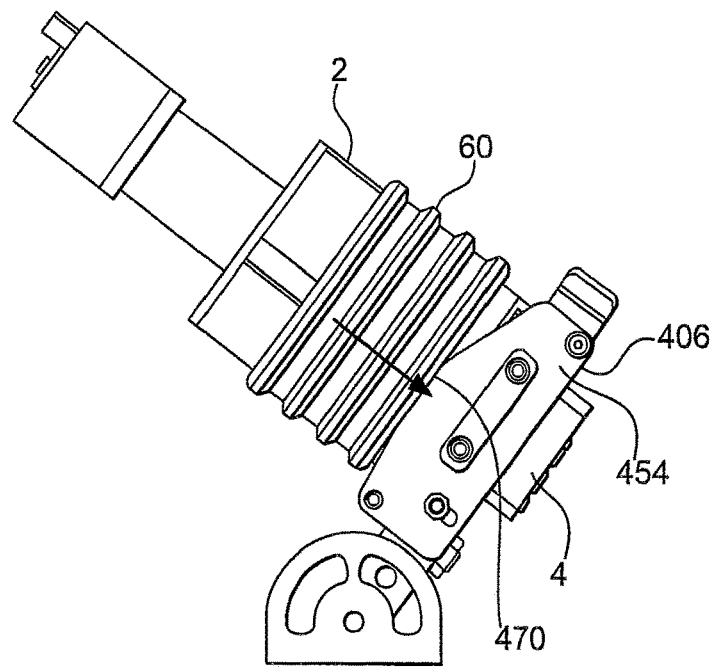
FIG. 23 illustrates a side-perspective view of a tool station having a tool base assembly and a wrist assembly engaging the tool base assembly of the automated tool change assembly of the present invention.

With reference to FIG. 23, plate 454 is shown adjacent the wrist assembly 4. The plate 454 of lock ramp 406 can have a face 470, which can be aligned such that the wrist assembly 4 can rotationally engage tool base assembly 2. The axial force from the lock collar 60 moves the lock ramps 406 into the open position during the automated tool pick, thereby opening the striker 458.

Figure 24:
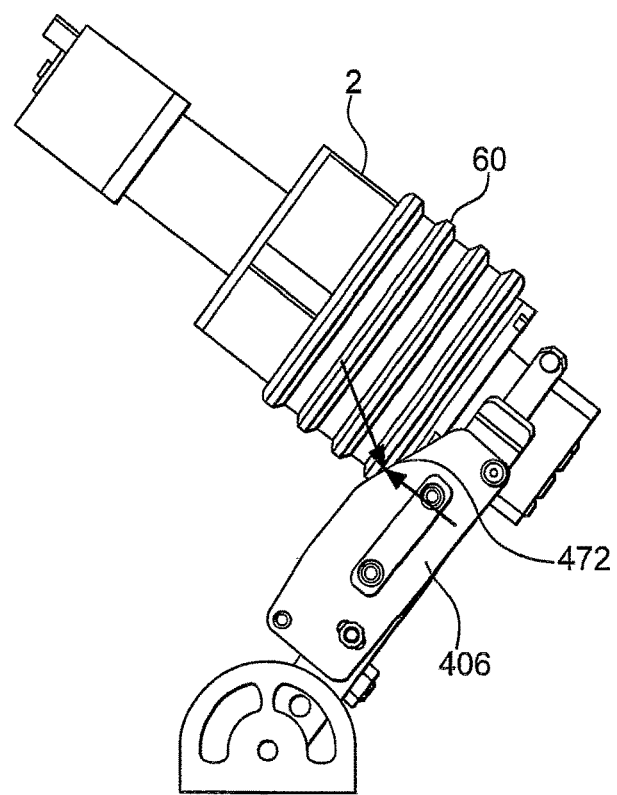
FIG. 24 illustrates a side-perspective view of the tool station with the wrist tool exiting the tool station of the automated tool change assembly of the present invention.

With reference to FIG. 24, during parking of a tool, a slanted face 472, of lock ramp 406, can have a slope automatically providing the penultimate step in the disengagement process to slide back the lock collar 60, thereby releasing the pins 58a-58d of the wrist assembly 4 as it is moved into place to park a tool base assembly 2 into the tool station 400. Parking also moves the locking ramps 406 into the open position as the force of the locking collar 60 pushes on the lock ramp 406. To completely disengage, a final rotation of the wrist assembly 4 counter to tool base assembly 2 can be given. When the wrist assembly 4 is removed, the striker 458 is free to close, locking the tool base assembly 2 to the tool station 400.

Figure 25:
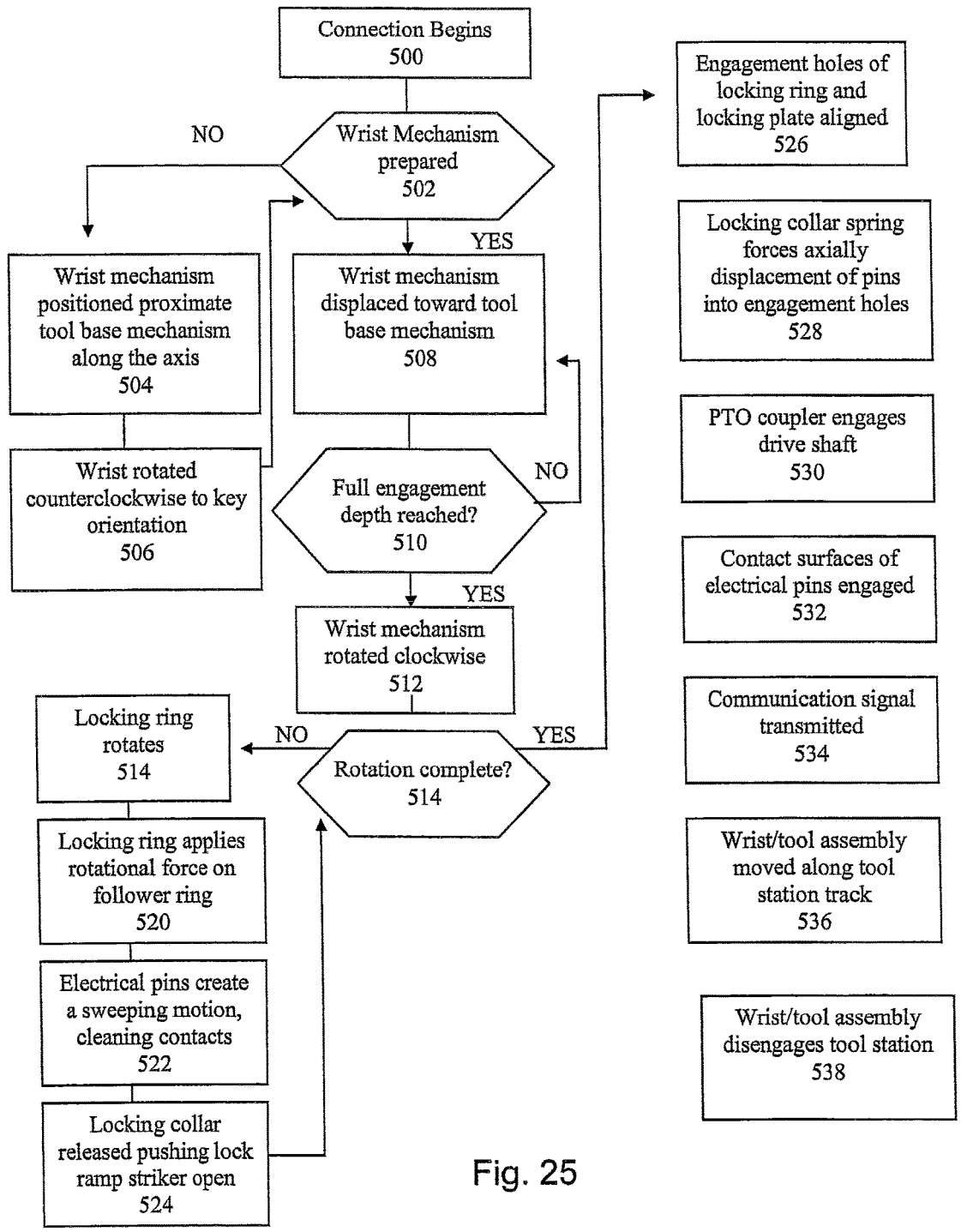
FIG. 25 is a block diagram illustrating the steps to connect a wrist assembly to a tool base assembly using a tool station of the automated tool change assembly of the present invention.

With reference to FIG. 25, a method of connecting a wrist assembly 4 with a tool base assembly 2 begins at block 500 by providing a wrist assembly 4 and tool base assembly 2. The tool base assembly 2 can be engaged with a tool station 400, as shown in FIG. 22. At step 502, the wrist assembly 4 is prepared by displacing it toward the tool base assembly 2. In one embodiment, approximately one inch away. When the wrist assembly 4 is positioned proximate to the tool base assembly 2, as shown in FIG. 1, the wrist assembly 4 can be displaced axially into the tool base assembly 2 at block 508. While the wrist assembly is being displaced toward the tool base assembly 2, at condition 510, this continues until a full engagement depth has been reached. When full engagement depth has been reached, the wrist assembly 4 has engaged tool base assembly 2 and the tool base assembly 2 will have a lock ring 6 inside of the wrist assembly 4, as shown in FIG. 5a. At block 514, tool base assembly 2 is rotated relative to the wrist assembly 4. As the locking ring 6 of the tool base assembly 2 rotates at block 514, the locking ring 6 applies a rotational force on the follower ring at block 520. At block 522, the electrical pins of the electrical connector 8 and electrical receiver 16 create a sweeping motion, thereby cleaning contacts of debris and moving into contact at block 522. At block 224, the locking collar 60 is released. The locking ring 6 has moved the follower ring 14 rotationally opening a passageway to aligned holes of the locking ring 6, locking plate 12, and the lock hub 52, as shown in FIG. 9. Once rotation is completed at block 514, engagement holes of the locking ring 6 and locking plate 12 are aligned at block 526. At block 528, the locking collar spring forces axial displacement of the pins 58a-58d into aligned holes of the lock ring 6, lock plate 12, and lock hub 52. Engaging the drive shaft 76 at block 530, the PTO coupler 310 forms a mechanical power pass thru. The contact surfaces of the conductor 218, 220 are engaged at block 532, as shown in FIG. 16. At block 534, a communication signal can be transmitted from the onboard microprocessor of the tool base assembly 2 to the processor of the arms 404 or further down to a computer processor housed on the robot. At block 536, the wrist assembly 4 and tool base assembly 2 are moved off of the tool station track 436. At block 538, the wrist assembly 4 and tool base assembly 2 disengages with the tool station 400.

Figure 26:
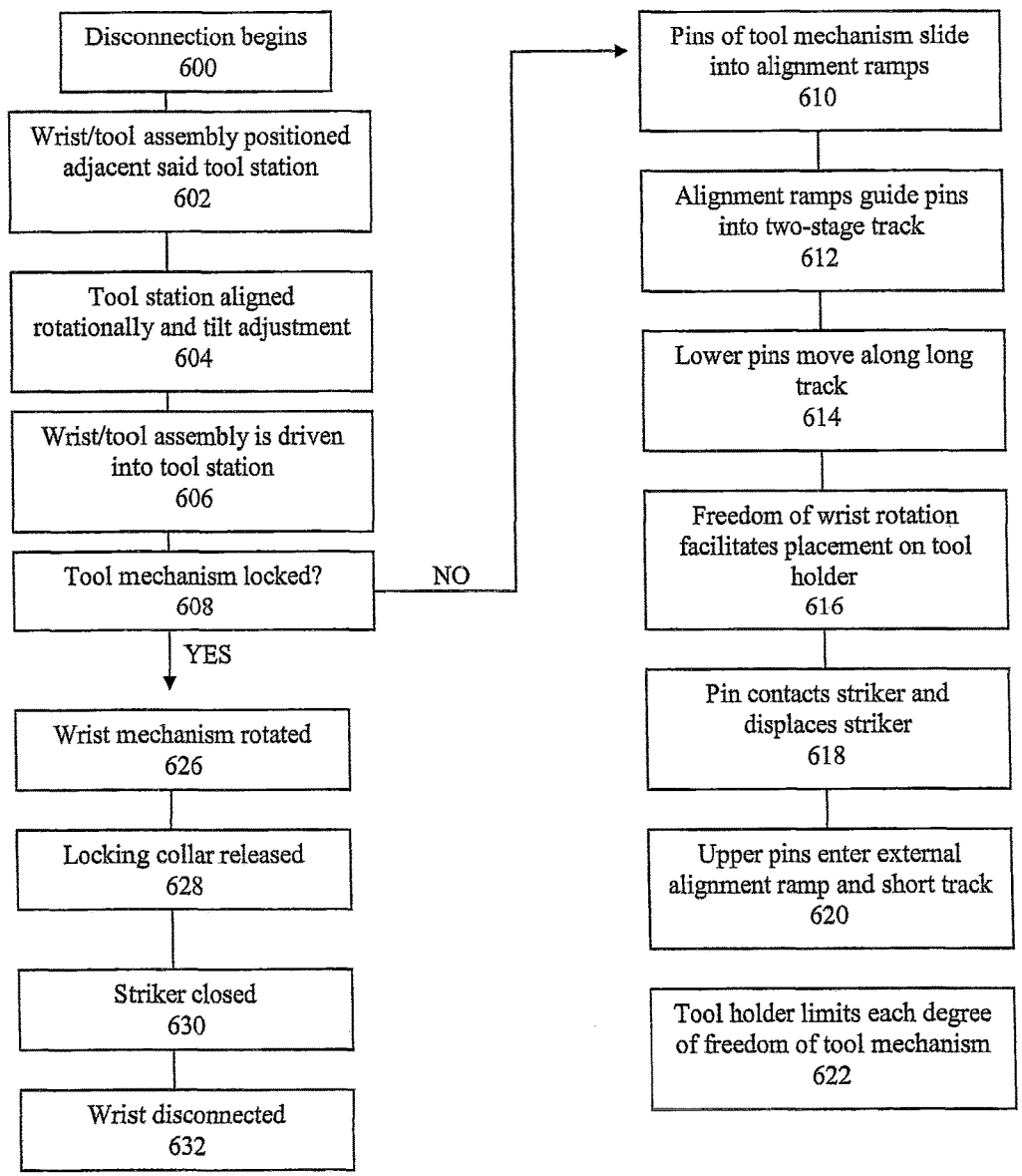
FIG. 26 is a block diagram illustrating exemplary steps to disconnect a tool base assembly from a wrist assembly of the automated tool change assembly of the present invention.

With reference to FIG. 26, a method of disconnecting a tool base assembly 2 from a wrist assembly 4 includes either a manual method or a method automatically using the tool station 400. The disconnection begins at block 600 with a connected tool base assembly 2 and wrist assembly 4. The wrist assembly 4 and tool base assembly 2 are positioned adjacent to a holder at block 602, as shown in FIG. 24. Next, the tool station 400 is aligned rotationally and the tilt is adjusted to receive the wrist assembly 4 at block 604.

Figure 28:
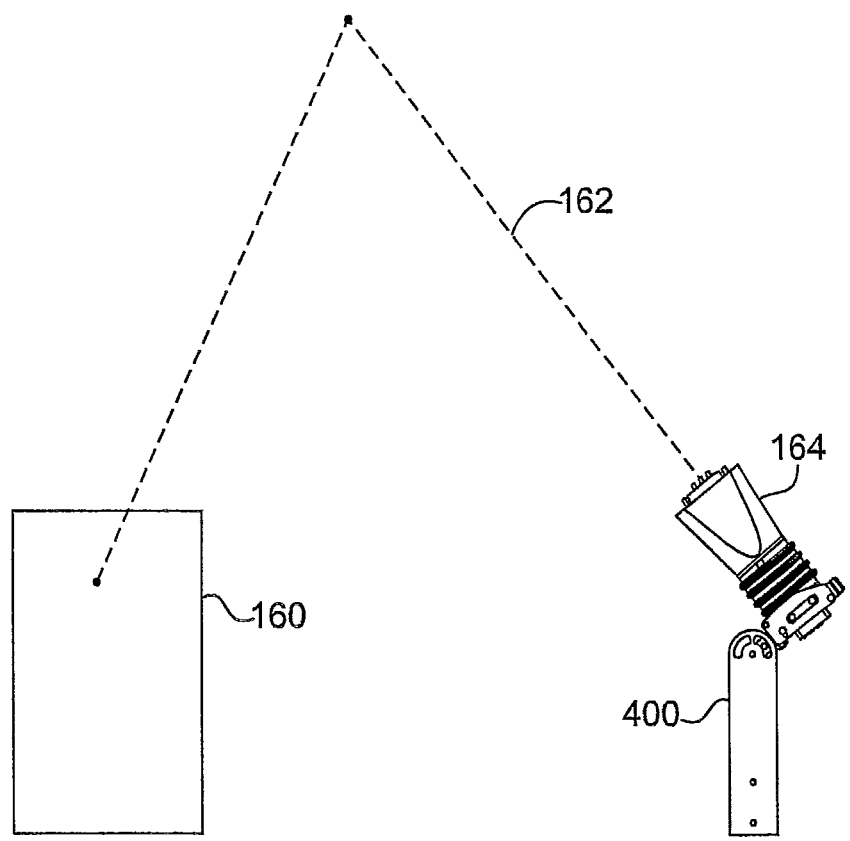
FIG. 28 is a diagram illustrating a robot with a two-dimensional arm utilizing the present invention.

With reference to FIG. 28, the robot 160 can have a two degree freedom arm 162. The tool station 400 provides flexibility to line the arm 162 up with the automated tool change assembly 164 by positioning the horizontal plane of the tool station assembly 400 in the horizontal plane of the arm 162. For alignment of the tool, when the tool station 400 is positioned around robot 160, the lateral center plane of the wrist plane can be positioned coincident with the center plane of the tool station 400 by rotating the legs of the tool station 400 appropriately.

With continuing reference to, block 604 can be done before beginning the method to provide proper station configuration. At block 606, the wrist assembly 4 is driven electronically (or manual placement) onto the tool station 400. This movement causes the slanted face 472 to contact the locking collar 60. Moving the locking collar 60 onto slanted face 472 when collar 60 is locked, forces the collar 60 to open, causing the pins 58a-58d of the locking collar 60 to move out of lock ring 6 and lock plate 12. At block 610, pins of the tool base assembly 2 slide into the alignment ramps 310. At block 612, the alignment ramps 310 guide the pins into the two-stage track 436, as shown in FIGS. 21a-21c. The lower pins move along the track 436 at block 614. At block 616, rotational freedom about the axis of pins 36a-36b facilitates placement of the tool on tool station 400. Contacting the striker 458, pins 36a-36b cause the striker to open, allowing the pins to enter further track 436 at block 618, moving the upper pins 320 further onto the ramp, places the lower pins in a position adjacent the lock ramps, guiding them into the track 436. At block 622, when the pins 37a-37b have entered the track 436, all degrees of freedom is restricted. Pins 58a-58d is finally free of the tool base assembly 2. With release of pins 58a-58d, the wrist assembly 4 can be rotated, automatically or manually. The wrist assembly 4 is rotated automatically using a motor inside the wrist assembly 4 at block 626. In one embodiment, the wrist assembly 4 rotates 45 degrees to open. At block 628, the locking collar 60 is blocked by follower ring 14. At block 630, the striker 458 is closed, locking the tool base assembly 2 into place, as shown in FIG. 21c. At block 632, the wrist assembly 4 is disconnected, as shown in FIG. 22.

The automated tool change assembly can be connected and disconnected using programmed scripts processed by a computer processor on a robot computer and transmitted to drives throughout the arm, wrist, and can include the end effector.

A CanBus can provide communication channels between the operation control unit OCV, arm, and end effector to transmit in addition to supplying power signals. The signals can be messages that instruct drives that control components. The automated electronics need one drive for each motor and can have the motor driver in an arm or an end effector. The motors can be smart motors, monitoring details regarding behavior of each tool. Controllers can quickly configure the drives based on feedback. The motor can have sensors to feed back to the drive information about what it's doing. The CanBus supplies the power and the electrical connections and can limit the supply of power or can be told to limit the supply of power to accommodate the motor sensors. The power supply can be a 48 volt vehicle battery, however, this is not a limiting feature of the invention, supplying 20 amps to the arm. However, one skilled in the art will recognize other electrical supplies can replace the battery.

Figure 27:
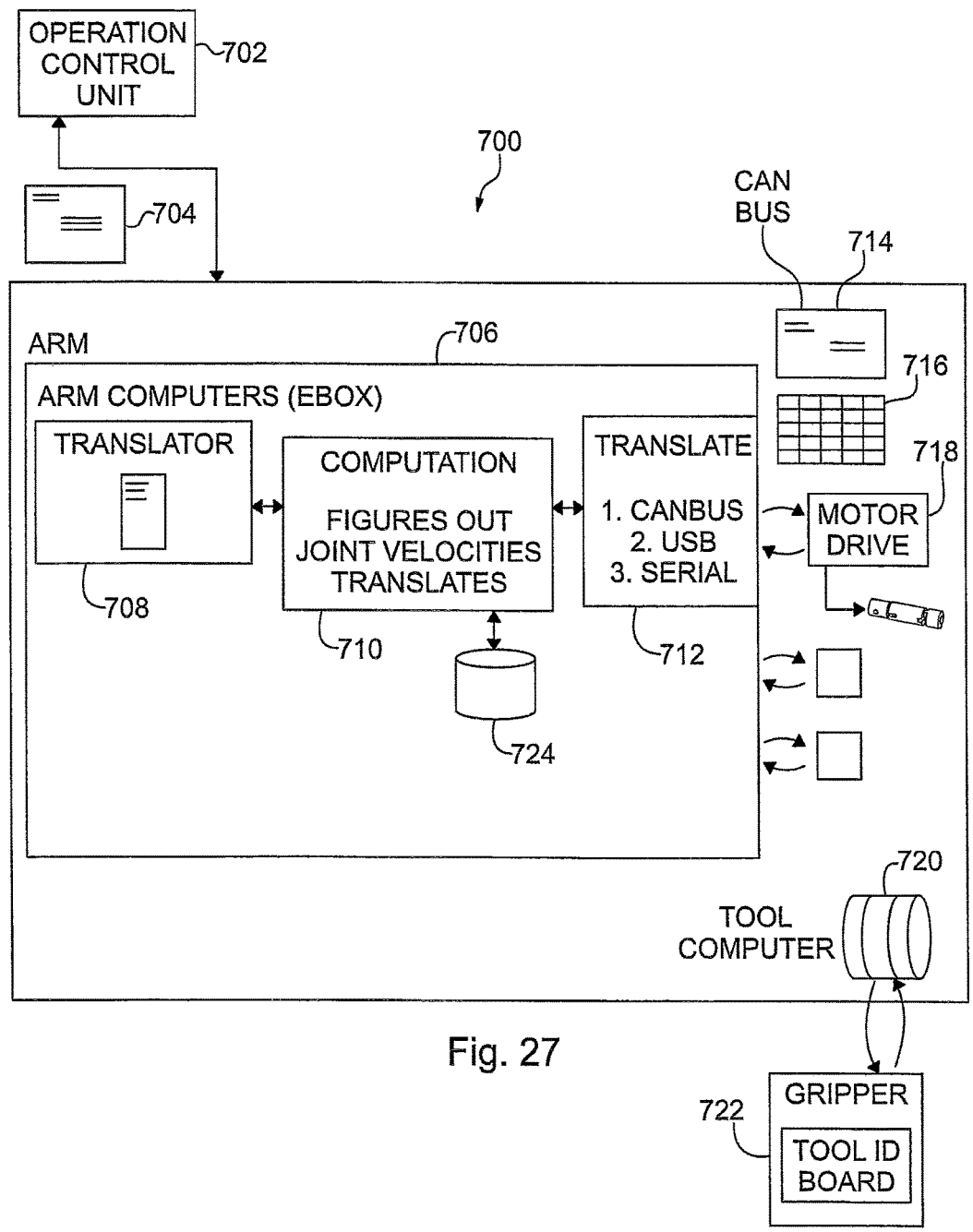
FIG. 27 is a block diagram illustrating information flow in a robot manipulator of the automated tool change assembly of the present invention.

With reference to FIG. 27, an arm 100 receives information sent throughout the manipulator from operator control unit 702 using Joint Architecture for Unmanned Systems (JAUS) to transmit a message 704. The motor controller can be coupled to an arm or alternatively, can be positioned closer to the end effector and can receive power through the CanBus. The motor controller can control a motor, and alternatively, can control the brakes on the motor. The motor controller can act like an amplifier.

Program code can provide instructions to the components to complete an action. Using motor currents, a processor can determine proper actions based on conditional logic within a program. Program code can also be used to control processors to cross check absolute sensors in motors. When behavior is outside a range, steps can be repeated until the proper range is reached. Scripts can provide a series of predetermined steps operating the arm and end effector. A microprocessor, sensors, and an onboard computer chip can be used to move end effectors to a specific position. Error messages can be sent to the operator as they occur.

With continued reference to FIG. 27, the arm computer 706 receives the instructions from the OCU 702. A translator 712 translates the instructions, doing computation 710 to determine position and velocity of joints having an arm. Each joint may possibly have its own ebox. Next, the arm computer 706 sends to the translator 712 program code to translate instructions for sending to components over the CanBus, USB, or serial connection. Each CAN translated instruction provides a message 719 for identifying an outcome parameter in a grid 716, such as a movement of an arm or torque of a motor. The instructions can be used to control motor drive 712 or tool computer 720. Tool computer 720 transmits to a tool, such as gripper 722 and also is capable to read the tool ID Board.

With continuing reference to FIG. 27, operation control unit 702 can have an attach tool button for attaching a tool, such as a gripper to the robotic manipulator. When a user presses the attach tool button, a message 704 is sent to the arm 706 and is translated at the translator 708. The message 704 can trigger a series of steps to attach a tool. In the script, the first step is to move the arm of the robot to a safe altitude and joint space. This involves moving the arm straight up until the arm is high enough for safe clearance. Next, the arm is positioned near the tool station that is used to hold the tools a safe position away from the robot deck. A database 724 can be searched by the computation module 710 to acquire the station ID the tool station holding the gripper, or if another tool is being used, it would search for the station ID for that tool. After the computation module locates the station ID, it determines a calibration point, the point used for all measurements, by looking up in the database using the station ID. Next, the computation 710 determines the important points based on the calibration point. The arm can then move to a pre-engaged point in joint space near the station. The wrist can be twisted to a pre-engage angle, for example, approximately 45°. Actions are accomplished by sending messages via translator 712 to the different motor drives 718 and tool computers 720, attached to the tools, such as gripper 722. Motor current can be limited causing the engagement force to be less than full force. The arm is driven in Cartesian mode along the engagement vector. The arm continues to be driven along the vector until the tool is connected. Additionally, if a time limit or a final position is not reached, the arm movement can be stopped because the time and/or position indicate error. The scripts can also use motor current and position information received from drives. If motor current is exceeded, or if a position error is determined within a range, arm movement can be stopped. After the arm is connected, the wrist is twisted to what is an over-engaged angle. The arm computer can determine that the wrist is engaged if the tool ID boot-up is accomplished. In addition, the angle of engagement can be tracked. If the motor current exceeds a limit, for compliance, the wrist is stopped from twisting. When the software detects and knows that the tool has been attached, the wrist is twisted back to engagement angle, therefore it is twisted to center the wrist. The arm computer 706 calculates angles to determine the proper position of the engagement. The arm is driven to a post-engagement point in Cartesian mode after it is engaged by sliding up and out of the tool station. The collar will start to snap down, causing the engagement pins to move into place. The arm can then be driven to a safe point. Next, the OCU 702 of the arm computer 706 can determine exactly which tool is engaged by checking the tool ID information to reconcile that the proper tool was loaded. Based on the tool ID, the motors are configured and the variable current or any current is determined. The PTO motors are configured based on the tool ID and any motor drives on the tool are initialized. The station ID is stored in memory or a database in order to determine where to return the tool when the present job is completed. Finally, the tool information is sent to the OCU 702 so that the OCU can determine which tool is attached to the manipulator. The OCU 702 can then initialize the operation settings, which are screen controls, operator controllers, and joy sticks for the new tool. At this point, the operator can control the new tool by sending commands from the operator control unit to the arm computer 706.

Additional procedures are available to perform other functions, such as calibrating tool stations. The tool station can be calibrated by placing a tool in the station and then driving the arm to a calibration point. A saved calibration point button can be programmed on the operator control unit to save the actual calibration point that is determined. This step sends a message to the arm computer 706 to store the current calibration point in database 724. The station ID is also stored for the specific calibration point and the next time that tool is needed, the computer can retrieve the information from the database.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural reference unless the context clearly dictates otherwise.

The invention claimed is:

1. An assembly for automatically connecting an end effector to a robotic arm comprising:
   a first joint member comprising a locking ring, and a connection plate; and
   a second joint member comprising a cylindrical body, a locking plate, a locking member, and a locking collar, said locking collar being coaxially aligned with and slidably coupled to said cylindrical body, a locking collar carrier plate including said locking member extending axially therefrom, said second joint member including a spring providing axial force on said locking collar,
   such that said locking plate of said second joint member engages said locking ring of said first joint member, said locking plate and said locking ring having at least one intervening circumferentially spaced tab engageable in keyed relationship, said tab including an engagement hole extending axially therethrough,
   such that axially displacing said first joint member into said second joint member positions said first joint member locking ring inside said second joint member locking plate,
   such that a counter rotation between said first and second joint members slides said locking ring tab of said first joint member under said locking plate tab of said second joint member, aligning said engagement holes causing said spring force on said locking collar to push said locking member through said aligned engagement holes of said locking plate tab and said locking ring tab to connect said first joint member to said second joint member.

2. The assembly of claim 1, further including a follower ring, said follower ring having a tab positioned between said locking plate and said locking collar carrier plate such that said follower ring is preventing movement of said locking collar by preventing said locking member from entering said engagement holes, said follower ring tab further engaging said locking ring to prevent rotation of said locking ring past an alignment position, such that said locking ring aligns with said locking plate of said second joint member.

3. The assembly of claim 1, wherein said locking ring and said locking plate further including a plurality of tabs engageable in keyed relationship, such that a key tab of said locking ring uniquely engages with an opening formed between two tabs of said lock plate providing only one engagement orientation of said locking plate with said locking ring.

4. The assembly of claim 1, further comprising:
   a gear motor, said gear motor housed in said second joint member;
   a self aligning shaft; and
   wherein said self aligning shaft transfers mechanical power from said gear motor of said second joint member.

5. The assembly of claim 4, wherein said self aligning shaft further including:
   a coupler housed in said first joint member having a slotted head;
   a drive shaft having a dowel pin, a compression spring, and a drive hub housed in said second joint member, said drive hub having a slotted face, a cross slot and a stepped cylindrical bore,
   such that said drive shaft engages said cylindrical bore,
   such that said drive hub cross slot provides axial compliance, as translational freedom along an axis of the drive shaft is limited by the length of said cross slot when said dowel pin interacts with said cross slot,
   such that said compression spring positioned inside said cylindrical bore and coupled to said drive shaft, provides axial force away outward from said drive shaft, such that upon rotational alignment, said coupler engages the drive hub slotted face and a rotational torque is transferred from said drive shaft, through said drive hub to said coupler.

6. The assembly of claim 5, wherein mating said dowel pin to said cross slot of said drive hub provides said rotational torque.

7. The assembly of claim 1, wherein engagement of said locking member with said engagement holes of the locking ring tab and the locking plate tab locks three translational degrees of freedom and three rotational degrees of freedom.

8. The assembly of claim 1, wherein said assembly further comprising:
an electrical connector located in said first joint member; and
an electrical receiver located in said second joint member, said receiver comprising:
a pin holder and a pin having a contact surface, said pin holder for holding said pin in alignment for coupling said electrical receiver pin contact surface to a contact surface of a pin in a pin holder of said electrical connector,
such that a displacement positions said electrical connector aligned with electrical receiver, said counter rotation causing an electrical connection.

9. The assembly of claim 8, wherein coupling said electrical receiver pin contact surface to said electrical connector pin contact surface comprises a rotary wiping motion as the first joint member is rotatably connected to the second joint member, said rotary wiping motion for removing debris from said electrical contact surfaces.

10. The assembly of claim 9, wherein said electrical receiver further comprises a flexible member resting in a notched wall of said pin holder adjacent said pin of said electrical receiver, wherein said flexible member provides force directed toward a center of the electrical receiver, said force pressing said contact surfaces together during rotation of said first joint member with respect to said second joint member.

11. The assembly of claim 10, wherein said pin of said electrical receiver can pivot radially, such that said flexible member of electrical receiver further provides compliance or resistance to vibration.

12. The assembly of claim 8, wherein said electrical receiver pin comprises a grooved contact surface, said groove forming multiple contact lines when engaged with said pin of said electrical connector.

13. The assembly of claim 1, wherein the locking member is a pin, a screw, or a fastener, comprising a conical surface for mating a chamfered surface.

14. The assembly of claim 1, comprising chamfered edges on a plurality of teeth of said locking ring and said locking plate, wherein rotation forces said chamfered teeth of said locking ring to slide under said chamfered edges of said locking plate teeth, such that said chamfered edges facilitate engagement of said teeth of said locking ring and plate.

15. The assembly of claim 1, wherein said first joint member and said second joint member are engaged to form an electrical connection operative to transmit images, control signals, activators, identification information, video, USB, TCP/IP, UDP, and CanBus, feedback information.

16. The assembly of claim 1, wherein said second joint member is connected to a robot arm.

* * * * *